US012666470B2

(12) United States Patent
Gupta et al.

(10) Patent No.: US 12,666,470 B2
(45) Date of Patent: Jun. 23, 2026

(54) USER EQUIPMENT IDENTIFICATION IN EDGE COMMUNICATIONS ARCHITECTURE

(71) Applicant: QUALCOMM Incorporated, San Diego, CA (US)

(72) Inventors: Nishant Gupta, Bangalore (IN); Sunghoon Kim, San Diego, CA (US); Alan Soloway, Erie, CO (US); Dario Serafino Tonesi, San Diego, CA (US); Tom Chin, San Diego, CA (US); Ajith Tom Payyappilly, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 406 days.

(21) Appl. No.: 18/154,698

(22) Filed: Jan. 13, 2023

(65) Prior Publication Data

US 2023/0254912 A1 Aug. 10, 2023

(30) Foreign Application Priority Data

Feb. 8, 2022 (IN) .............................. 202221006637

(51) Int. Cl.
*H04W 76/10* (2018.01)
*H04W 60/04* (2009.01)

(52) U.S. Cl.
CPC ........... *H04W 76/10* (2018.02); *H04W 60/04* (2013.01)

(58) Field of Classification Search
CPC ....... H04W 76/10; H04W 60/04; H04W 8/26; H04W 76/11
See application file for complete search history.

(56) References Cited

U.S. PATENT DOCUMENTS

| | | | | |
|---|---|---|---|---|
| 2022/0191650 A1* | 6/2022 | Kim | ......................... | H04L 67/10 |
| 2022/0191776 A1* | 6/2022 | Kim | ...................... | H04L 67/306 |
| 2022/0263832 A1* | 8/2022 | Gupta | ................. | H04L 63/0838 |
| 2023/0291644 A1* | 9/2023 | Gautam | .................. | H04L 41/40 |
| 2024/0298170 A1* | 9/2024 | Xu | .......................... | H04W 8/26 |
| 2024/0298286 A1* | 9/2024 | Xu | ......................... | H04W 60/04 |
| 2025/0113395 A1* | 4/2025 | Starsinic | ........... | H04W 28/0925 |

FOREIGN PATENT DOCUMENTS

| | | |
|---|---|---|
| EP | 3944648 A1 | 1/2022 |
| KR | 20200130043 A | 11/2020 |

OTHER PUBLICATIONS

3GPP TS 23.558: "3rd Generation Partnership Project, Technical Specification Group Services and System Aspects, Architecture for Enabling Edge Applications, (Release 17)", 3GPP, Mobile Competence Centre, 650, Route Des Lucioles, F-06921 Sophia-Antipolis Cedex, France, V1.1.0, Oct. 25, 2020, XP051947107, pp. 1-121.

(Continued)

*Primary Examiner* — Luat Phung
(74) *Attorney, Agent, or Firm* — Harrity & Harrity, LLP

(57) ABSTRACT

Various aspects of the present disclosure generally relate to wireless communication. In some aspects, a user equipment (UE) may transmit identification information, wherein the identification information includes a UE identifier or connectivity information. The UE may communicate based at least in part on transmitting the identification information. Numerous other aspects are described.

30 Claims, 16 Drawing Sheets

1100 ——➤

(56) References Cited

OTHER PUBLICATIONS

Convida Wireless LLC: "EEC Context", 3GPP TSG-SA WG6 Meeting #41-e, S6-210235, 3rd Generation Partnership Project, Mobile Competence Centre, 650, Route Des Lucioles, F-06921 Sophia-Antipolis Cedex, France, vol. SA WG6, No. e-meeting, Jan. 18, 2021-Jan. 26, 2021, Jan. 23, 2021, XP052181751, 10 pages. International Search Report and Written Opinion—PCT/US2023/061373—ISA/EPO—May 4, 2023.

* cited by examiner

Transmit identification information, wherein the identification information includes a UE identifier or connectivity information

1110

Communicate based at least in part on transmitting the identification information

1120

1100

1210 Receive, from a UE, identification information, wherein the identification information includes a UE identifier or connectivity information 1220 Communicate using the identification information

1200

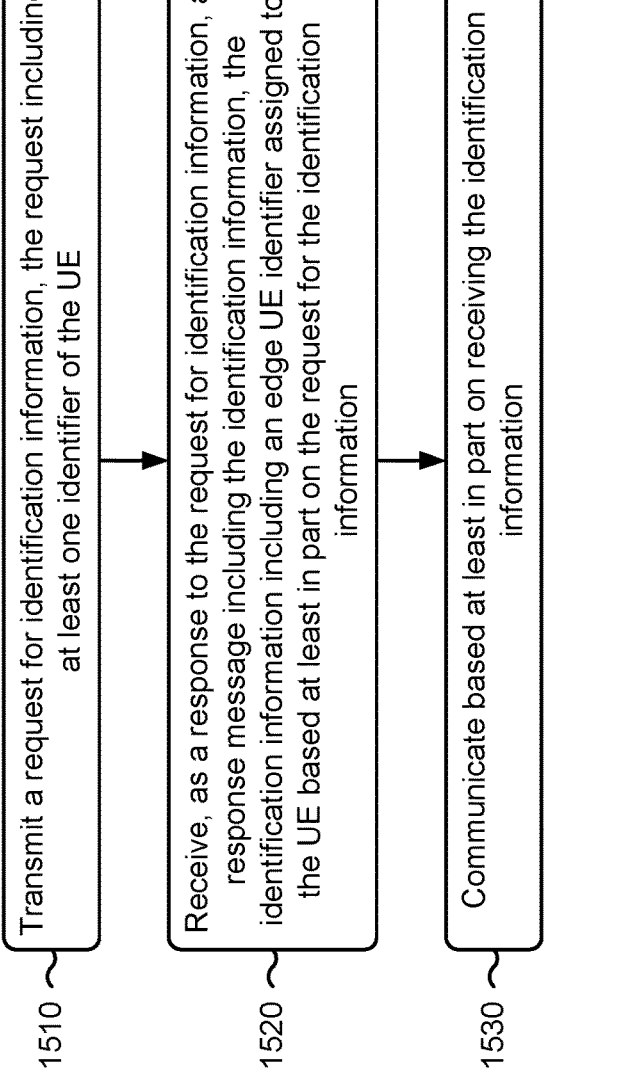

1510 Transmit a request for identification information, the request including at least one identifier of the UE 1520 Receive, as a response to the request for identification information, a response message including the identification information, the identification information including an edge UE identifier assigned to the UE based at least in part on the request for the identification information 1530 Communicate based at least in part on receiving the identification information

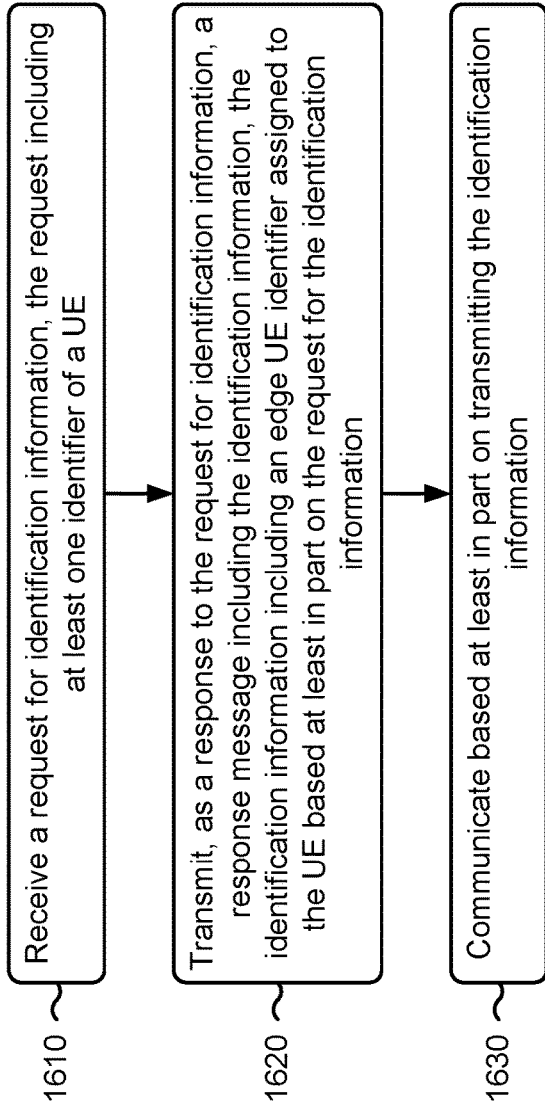

1610 — Receive a request for identification information, the request including at least one identifier of a UE 1620 — Transmit, as a response to the request for identification information, a response message including the identification information, the identification information including an edge UE identifier assigned to the UE based at least in part on the request for the identification information 1630 — Communicate based at least in part on transmitting the identification information

USER EQUIPMENT IDENTIFICATION IN EDGE COMMUNICATIONS ARCHITECTURE

CROSS-REFERENCE TO RELATED APPLICATION

This Patent Application claims priority to India Patent Application No. 202221006637, filed on Feb. 8, 2022, entitled "USER EQUIPMENT IDENTIFICATION IN EDGE COMMUNICATIONS ARCHITECTURE," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for user equipment identification in edge communications architecture.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to transmit a request for identification information, the request including at least one identifier of the UE. The one or more processors may be configured to receive, as a response to the request for identification information, a response message including the identification information, the identification information including an edge UE identifier assigned to the UE based at least in part on the request for the identification information. The one or more processors may be configured to communicate based at least in part on receiving the identification information.

Some aspects described herein relate to a network node for wireless communication. The network node may include a memory and one or more processors coupled to the memory. The one or more processors may be configured to receive a request for identification information, the request including at least one identifier of a UE. The one or more processors may be configured to transmit, as a response to the request for identification information, a response message including the identification information, the identification information including an edge UE identifier assigned to the UE based at least in part on the request for the identification information. The one or more processors may be configured to communicate based at least in part on transmitting the identification information.

Some aspects described herein relate to a method of wireless communication performed by a UE. The method may include transmitting a request for identification information, the request including at least one identifier of the UE. The method may include receiving, as a response to the request for identification information, a response message including the identification information, the identification information including an edge UE identifier assigned to the UE based at least in part on the request for the identification information. The method may include communicating based at least in part on receiving the identification information.

Some aspects described herein relate to a method of wireless communication performed by a network node. The method may include receiving a request for identification information, the request including at least one identifier of a UE. The method may include transmitting, as a response to the request for identification information, a response message including the identification information, the identification information including an edge UE identifier assigned to the UE based at least in part on the request for the identification information. The method may include communicating based at least in part on transmitting the identification information.

Some aspects described herein relate to a non-transitory computer-readable medium that stores a set of instructions for wireless communication by a UE. The set of instructions, when executed by one or more processors of the UE, may cause the UE to transmit a request for identification information, the request including at least one identifier of the UE. The set of instructions, when executed by one or more processors of the UE, may cause the UE to receive, as a response to the request for identification information, a response message including the identification information, the identification information including an edge UE identifier assigned to the UE based at least in part on the request for the identification information. The set of instructions, when executed by one or more processors of the UE, may cause the UE to communicate based at least in part on receiving the identification information.

Some aspects described herein relate to a non-transitory computer-readable medium that stores a set of instructions for wireless communication by a network node. The set of instructions, when executed by one or more processors of the network node, may cause the network node to receive a request for identification information, the request including at least one identifier of a UE. The set of instructions, when executed by one or more processors of the network node, may cause the network node to transmit, as a response to the request for identification information, a response message including the identification information, the identification information including an edge UE identifier assigned to the UE based at least in part on the request for the identification information. The set of instructions, when executed by one or more processors of the network node, may cause the network node to communicate based at least in part on transmitting the identification information.

Some aspects described herein relate to an apparatus for wireless communication. The apparatus may include means for transmitting a request for identification information, the request including at least one identifier of the apparatus. The apparatus may include means for receiving, as a response to the request for identification information, a response message including the identification information, the identification information including an edge apparatus identifier assigned to the apparatus based at least in part on the request for the identification information. The apparatus may include means for communicating based at least in part on receiving the identification information.

Some aspects described herein relate to an apparatus for wireless communication. The apparatus may include means for receiving a request for identification information, the request including at least one identifier of a UE. The apparatus may include means for transmitting, as a response to the request for identification information, a response message including the identification information, the identification information including an edge UE identifier assigned to the UE based at least in part on the request for the identification information. The apparatus may include means for communicating based at least in part on transmitting the identification information.

Some aspects described herein relate to a method of wireless communication performed by a UE. The method may include transmitting identification information, wherein the identification information includes a UE identifier or connectivity information. The method may include communicating based at least in part on transmitting the identification information.

Some aspects described herein relate to a method of wireless communication performed by a network node. The method may include receiving, from a UE, identification information, wherein the identification information includes a UE identifier or connectivity information. The method may include communicating using the identification information.

Some aspects described herein relate to a UE for wireless communication. The UE may include a memory and one or more processors coupled to the memory. The one or more processors may be configured to transmit identification information, wherein the identification information includes a UE identifier or connectivity information. The one or more processors may be configured to communicate based at least in part on transmitting the identification information.

Some aspects described herein relate to a network node for wireless communication. The network node may include a memory and one or more processors coupled to the memory. The one or more processors may be configured to receive, from a UE, identification information, wherein the identification information includes a UE identifier or connectivity information. The one or more processors may be configured to communicate using the identification information.

Some aspects described herein relate to a non-transitory computer-readable medium that stores a set of instructions for wireless communication by a UE. The set of instructions, when executed by one or more processors of the UE, may cause the UE to transmit identification information, wherein the identification information includes a UE identifier or connectivity information. The set of instructions, when executed by one or more processors of the UE, may cause the UE to communicate based at least in part on transmitting the identification information.

Some aspects described herein relate to a non-transitory computer-readable medium that stores a set of instructions for wireless communication by a network node. The set of instructions, when executed by one or more processors of the network node, may cause the network node to receive, from a UE, identification information, wherein the identification information includes a UE identifier or connectivity information. The set of instructions, when executed by one or more processors of the network node, may cause the network node to communicate using the identification information.

Some aspects described herein relate to an apparatus for wireless communication. The apparatus may include means for transmitting identification information, wherein the identification information includes a UE identifier or connectivity information. The apparatus may include means for communicating based at least in part on transmitting the identification information.

Some aspects described herein relate to an apparatus for wireless communication. The apparatus may include means for receiving, from a UE, identification information, wherein the identification information includes a UE identifier or connectivity information. The apparatus may include means for communicating using the identification information.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 15-16 are diagrams illustrating example processes associated with UE identification in an edge communications architecture, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
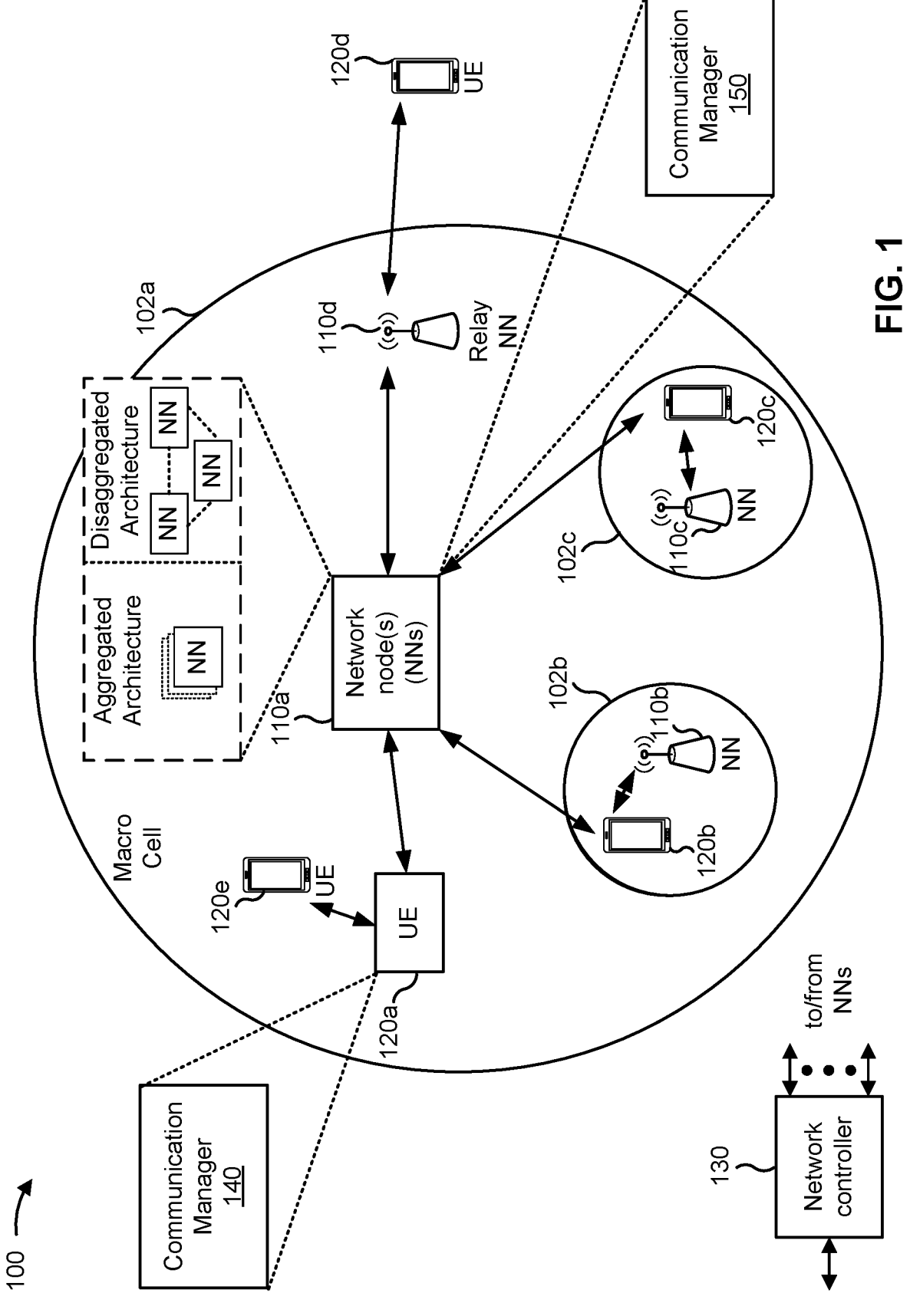
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120d in order to facilitate communication between the network node 110a and the UE 120d. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF)

band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may transmit identification information, wherein the identification information includes a UE identifier or connectivity information; and communicate based at least in part on transmitting the identification information. In some aspects, the communication manager 140 may transmit a request for identification information, the request including at least one identifier of the UE; receive , as a response to the request for identification information, a response message including the identification information, the identification information including an edge UE identifier assigned to the UE based at least in part on the request for the identification information; and communicate based at least in part on receiving the identification information. Additionally, or alternatively, the communication manager 140 may perform one or more other operations described herein.

In some aspects, a network node (e.g., a network node 110 or a network device communicating with the UE 120 via a network node 110) may include a communication manager 150. As described in more detail elsewhere herein, the communication manager 150 may receive, from a UE, identification information, wherein the identification information includes a UE identifier or connectivity information; and communicate using the identification information. In some aspects, the communication manager 150 may receive a request for identification information, the request including at least one identifier of a UE; transmit , as a response to the request for identification information, a response message including the identification information, the identification information including an edge UE identifier assigned to the UE based at least in part on the request for the identification information; and communicate based at least in part on transmitting the identification information.

Additionally, or alternatively, the communication manager 150 may perform one or more other operations described herein.

As indicated above, FIG. 1 is provided as an example. Other examples may differ from what is described with regard to FIG. 1.

Figure 2:
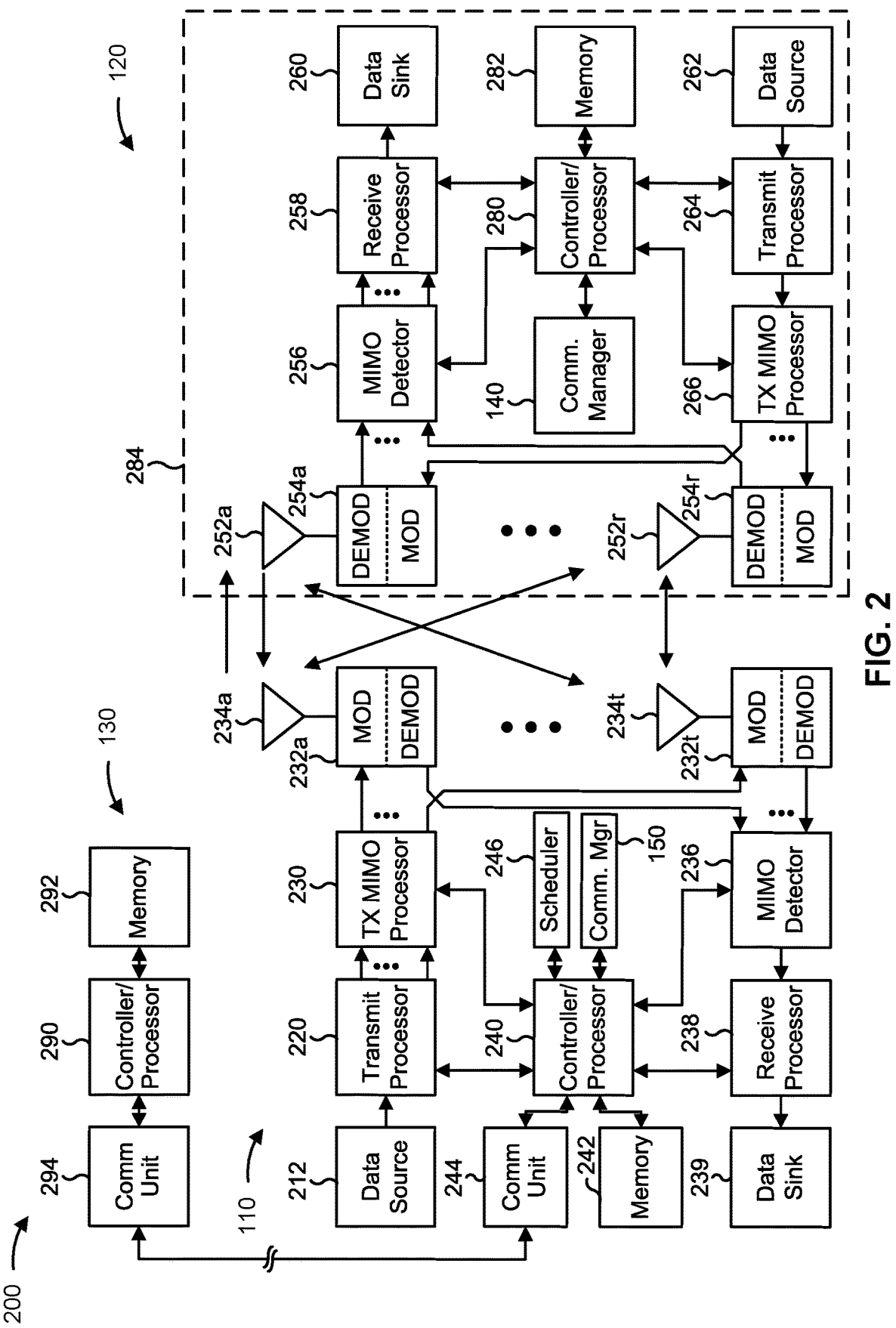
FIG. 2 is a diagram illustrating an example of a base station in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-14).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-14).

The controller/processor 240 of the network node 110, the controller/processor 280 of the UE 120, and/or any other component(s) of FIG. 2 may perform one or more techniques associated with UE identification in an edge communications architecture, as described in more detail elsewhere herein. For example, the controller/processor 240 of the network node 110, the controller/processor 280 of the UE 120, and/or any other component(s) of FIG. 2 may perform or direct operations of, for example, process 1100 of FIG. 11, process 1200 of FIG. 12, process 1500 of FIG. 15, process 1600 of FIG. 16, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1100 of FIG. 11, process 1200 of FIG. 12, process 1500 of FIG. 15, process 1600 of FIG. 16, and/or other processes as described herein. In some examples, executing instructions may include running the instructions, converting the instructions, compiling the instructions, and/or interpreting the instructions, among other examples.

In some aspects, the UE 120 includes means for transmitting identification information, wherein the identification information includes a UE identifier or connectivity information; and/or means for communicating based at least in part on transmitting the identification information. In some aspects, the UE 120 includes means for transmitting a request for identification information, the request including at least one identifier of the UE 120; means for receiving, as a response to the request for identification information, a response message including the identification information, the identification information including an edge UE identifier assigned to the UE 120 based at least in part on the request for the identification information; and/or means for communicating based at least in part on receiving the identification information. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node 110 includes means for receiving, from a UE, identification information, wherein the identification information includes a UE identifier or connectivity information; and/or means for communicating using the identification information. In some aspects, the network node 110 includes means for receiving a request for identification information, the request including at least one identifier of a UE; means for transmitting, as a response to the request for identification information, a response message including the identification information, the identification information including an edge UE identifier assigned to the UE based at least in part on the request for the identification information; and/or means for communicating based at least in part on transmitting the identification information. In some aspects, the means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
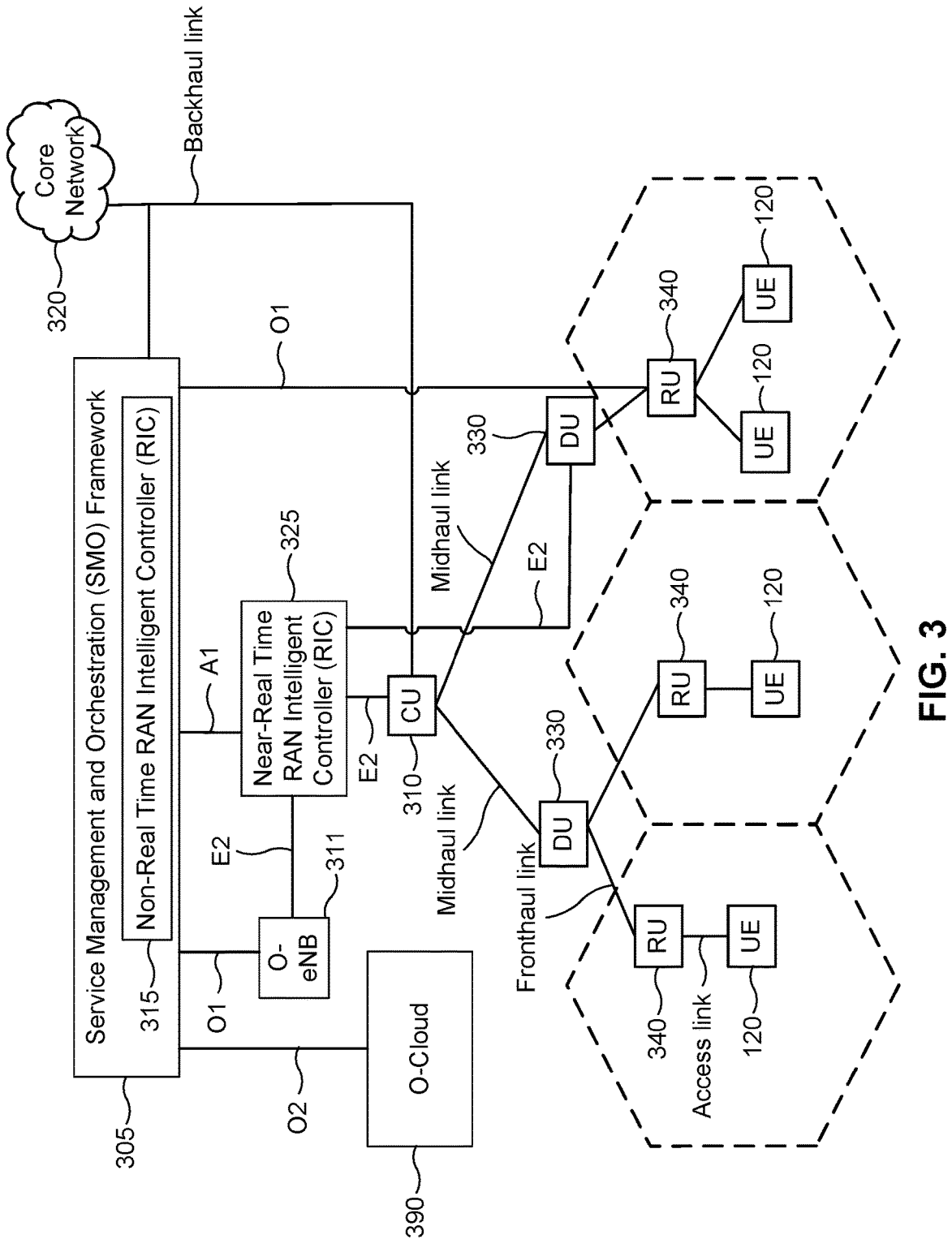
FIG. 3 is a diagram illustrating an example of a disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an AI interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as AI interface policies).

As indicated above, FIG. 3 is provided as an example. Other examples may differ from what is described with regard to FIG. 3.

Figure 4:
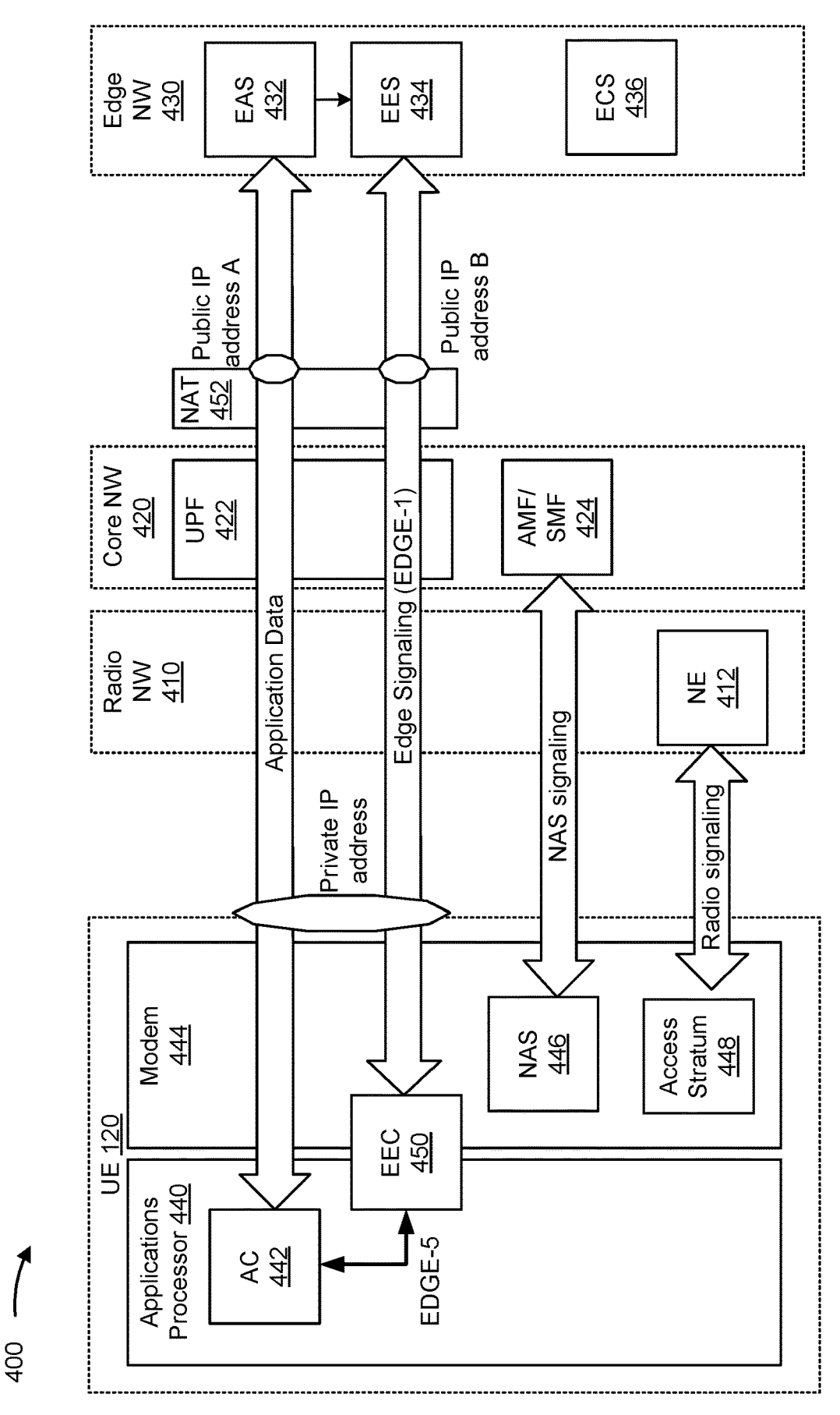
FIG. 4 is a diagram illustrating an example of a network architecture that includes an edge network, in accordance with the present disclosure.

FIG. 4 is a diagram illustrating an example of network architecture 400 that includes an edge network, in accordance with the present disclosure.

As shown in FIG. 4, the network architecture 400 includes a UE 120, a radio network 410, a core network 420, and an edge network 430. UE 120 may include an applications processor 440, which includes one or more application clients (ACs) 442, and a modem 444, which includes a non-access stratum (NAS) layer 446 and an access stratum (AS) layer 448. UE 120 may also be associated with an edge enabler client (EEC) 450, which may communicate with the one or more ACs 442 via an EDGE-5 interface.

As further shown in FIG. 4, radio network 410 may include a network entity (NE) 412, which may communicate, using radio signaling, with the AS layer 448 of UE 120. Core network 420 may include a user plane function (UPF) 422 and an access and mobility management function (AMF) and/or session management function (SMF) (AMF/SMF) 424. AMF/SMF 424 may communicate with NAS layer 446 via NAS signaling. Edge network 430 may include an edge application server (EAS) 432, an edge enabler server (EES) 434, and an edge configuration server (ECS) 436. Additional details regarding edge networks is described, for example, in 3GPP Technical Specification (TS) 22.261 Release 15 (Rel-15), 3GPP TS 23.501 Rel-15, and 3GPP TS 23.558 Release 17 (Rel-17) version 17.0.0, among other examples.

As further shown in FIG. 4, UE 120 (e.g., AC 442 and EEC 450) may attempt to communicate with network entities of edge network 430 (e.g., EAS 432 and EES 434). UEs may be publicly identified using a generic public subscription identifier (GPSI), such as a mobile station integrated services digital network (MSISDN) (e.g., a mobile number or another external identifier, such as a domain address). Avoiding sharing the MSISDN can improve privacy, but the UE may not have the external identifier stored to provide. Accordingly, core network 420 may expose one or more application programming interfaces (APIs) that allow the use of a UE's IP address for UE identification. However, a mobile network operator (MNO) may deploy network address translation (NAT) function to enable IP communication for many UEs within a public network. For example, UE 120 may have a private Internet Protocol (IP) address assigned to UE 120, and a network address translation function (NAT) 452 may translate the private IP address to a public IP address when IP communication is exposed by core network 420 to an external public network. For example, NAT 452 may translate a private IP address to a first public IP address A for UE 120 and AC 442 and to a second public IP address B for UE 120 and EEC 450. This may occur because NATs, such as NAT 452, may not have enough available public IP version 4 (IPv4) addresses to assign unique IPv4 address to each possible device. Accordingly, the NATs map multiple local private addresses to a unique public IP address and cycle through the multiple local private addresses.

EAS 432 may have access to the first public IP address A based at least in part on received application data IP packets. Similarly, EES 434 may have access to the second public IP address B based at least in part on received edge signaling IP packets on an EDGE-1 interface. Although it is possible that the first public IP address A and the second public IP address B will be the same IP address, such an occurrence is not guaranteed. Accordingly, if EAS 432 queries EES 434 with the first public IP address A, EES 434 may not recognize that EAS 432 is querying regarding UE 120. In other words, EES 434 may not have information associating the first public IP address A with the second public IP address B (e.g., as belonging to the same UE 120). This may result in an inability to identify a UE 120 at an edge enabler layer for use in invoking an API associated with UE 120 and/or communicating with UE 120.

As indicated above, FIG. 4 is provided as an example. Other examples may differ from what is described with respect to FIG. 4.

Figure 5:
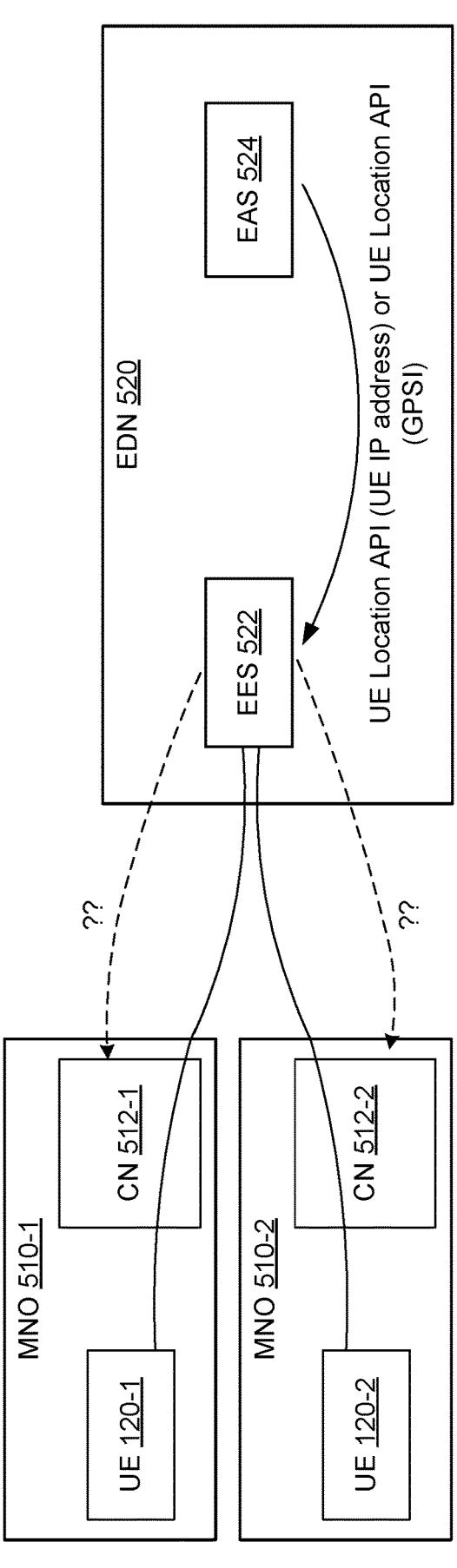
FIG. 5 is a diagram illustrating an example of a network architecture that includes a plurality of mobile network operators, in accordance with the present disclosure.

FIG. 5 is a diagram illustrating an example of a network architecture 500 that includes a plurality of mobile network operators (MNOs), in accordance with the present disclosure.

As shown in FIG. 5, a first MNO 510-1 and a second MNO 510-2 may provide communication networks in which UEs 120 may operate. For example, first MNO 510-1 may include a first UE 120-1 in communication with a core network (CN) 512-1 and second MNO 510-2 may include a second UE 120-1 in communication with a second CN 512-2. An edge data network (EDN) 520 may include an EES 522 and an EAS 524. EES 522 may serve a plurality of MNOs 510. For example, EES 522 may serve first UE 120-1 in first MNO 510-1 and second UE 120-2 in second MNO 510-2.

As further shown in FIG. 5, EES 522 may receive a request from EAS 524 including identification information, such as a UE IP address (e.g., a private IP address) or a GPSI. However, EES 522 may lack information to map the identification information (e.g., the private IP address or GPSI) to a correct MNO 510 and to query for UE 120 for related information. Furthermore, when a UE 120 is operating in a roaming state and connected with EES 522 via a visited public land mobile network (vPLMN), EES 522 may lack information associated with identifying a roaming CN that the UE 120 is using.

As indicated above, FIG. 5 is provided as an example. Other examples may differ from what is described with respect to FIG. 5.

Figure 6:
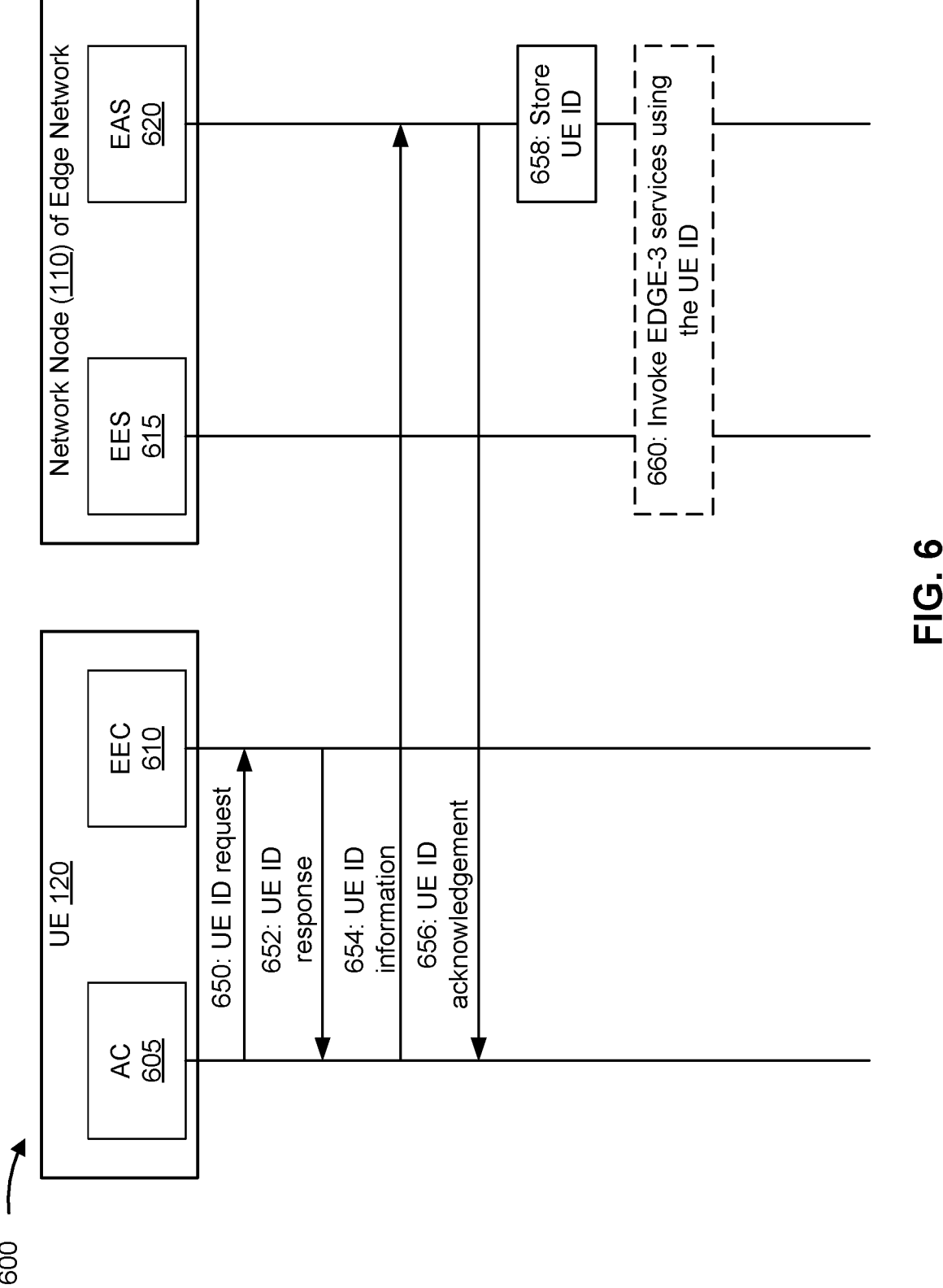
FIGS. 6-10 are diagrams illustrating examples associated with UE identification in an edge communications architecture, in accordance with the present disclosure.

FIG. 6 is a diagram illustrating an example 600 associated with UE identification in an edge communications architecture, in accordance with the present disclosure. As shown in FIG. 6, an AC 605, an EEC 610, an EES 615, and an EAS 620 may communicate with one another. In some aspects, AC 605 and/or EEC 610 may be components or entities included in or associated with UE 120. In some aspects, EES 615 and EAS 620 may be components or entities included in or associated with a network node of an edge network, such as a network node 110 or other network entity.

As shown by reference number 650, AC 605 may transmit a UE identification request to EEC 610. For example, AC 605 may request (via an API of EEC 610) that EEC 610 provide a UE identifier (UE ID) to AC 605. In some aspects, EEC 610 may have the UE ID to provide to AC 605 based at least in part on receiving a request. As shown by reference number 652, EEC 610 may transmit a response to AC 605. For example, based on receiving the UE identification request, EEC 610 may provide a UE ID to AC 605. As shown by reference number 654 and 656, AC 605 may transmit identification information indicating the UE ID and may receive an acknowledgement message as a response. For example, AC 605 may transmit a message that includes one or more fields set to identify or indicate the UE ID to EAS 620. As shown by reference numbers 658 and 660, EAS 620 may store the UE ID and may communicate with EES 615 to invoke EDGE-3 services using the UE ID. In this way, one or more network entities of the edge network that includes EES 615 and EAS 620 may communicate with UE 120 (e.g., AC 605 and EEC 610).

As indicated above, FIG. 6 is provided as an example. Other examples may differ from what is described with respect to FIG. 6.

Figure 7:
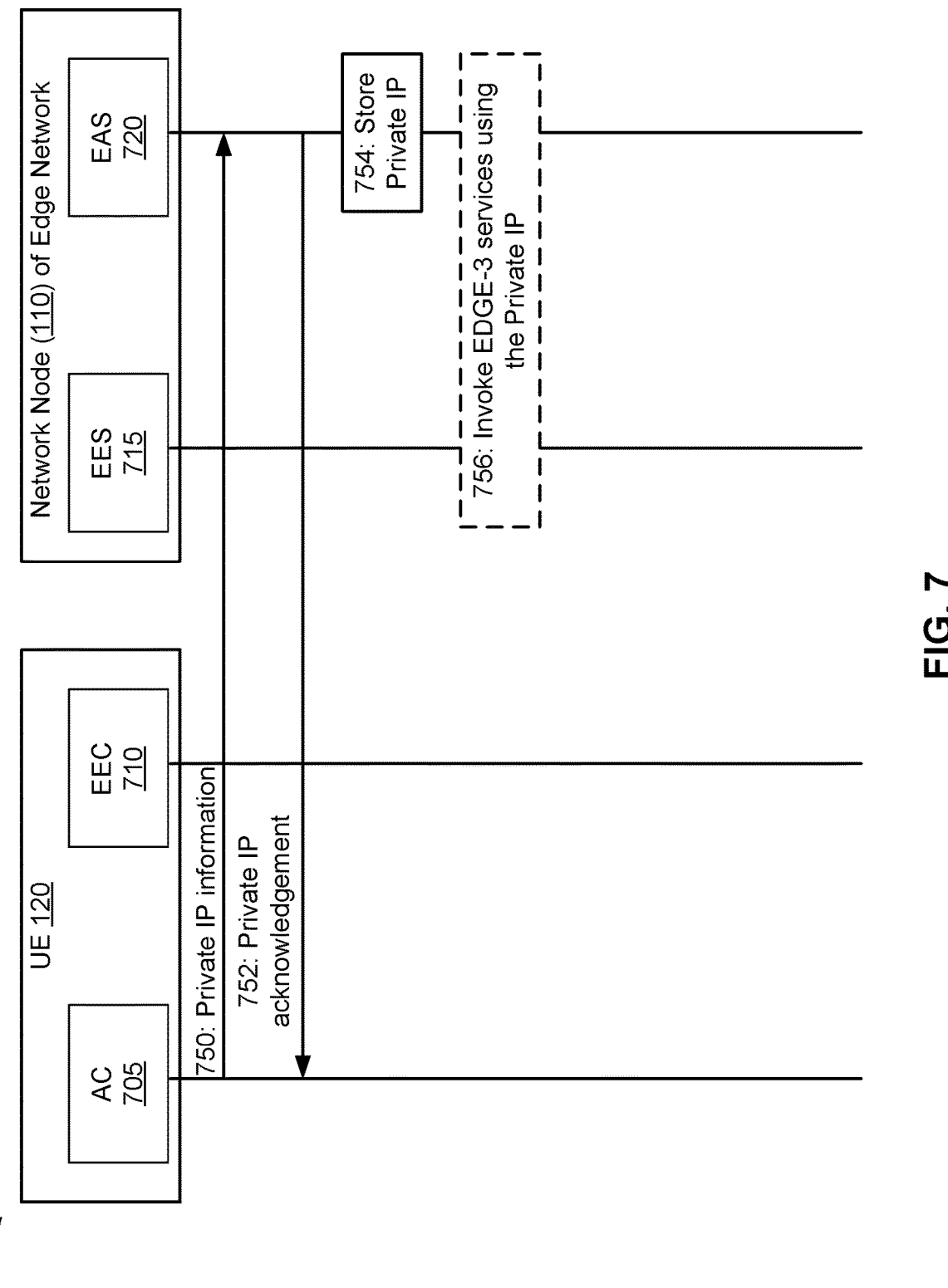

FIG. 7 is a diagram illustrating an example 700 associated with UE identification in an edge communications architecture, in accordance with the present disclosure. As shown in FIG. 7, an AC 705, an EEC 710, an EES 715, and an EAS 720 may communicate with one another. In some aspects, AC 705 and/or EEC 710 may be components or entities included in or associated with UE 120. In some aspects, EES 715 and EAS 720 may be components or entities included in or associated with a network node of an edge network, such as a network node 110 or other network entity.

As shown by reference number 750 and 752, AC 705 may transmit identification information indicating a private IP address (e.g., of UE 120) and may receive an acknowledgement message as a response. For example, AC 705 may transmit a message that includes one or more fields set to identify or indicate the private IP address to EAS 720. In this way, AC 705 can enable EAS 720 to use EDGE-3 services of the EES 715 using UE ID information as is described with regard to FIG. 6. Additionally, or alternatively, using the private IP address may reduce a security issue that may occur with regard to providing the UE ID to AC 705 and/or EAS 720. As shown by reference numbers 754 and 756, EAS 720 may store the private IP address and may communicate with EES 715 to invoke EDGE-3 services using the private IP address. In this way, one or more network entities of the edge network that includes EES 715 and EAS 720 may communicate with UE 120 (e.g., AC 705 and EEC 710). Additionally, or alternatively, an EDGE-3 service may implement an IP address to UE ID translation functionality, in which case, EAS 720 and/or EES 715 may use the UE ID to access EDGE-3 services after using the IP address to UE ID translation functionality.

As indicated above, FIG. 7 is provided as an example. Other examples may differ from what is described with respect to FIG. 7.

Figure 8:
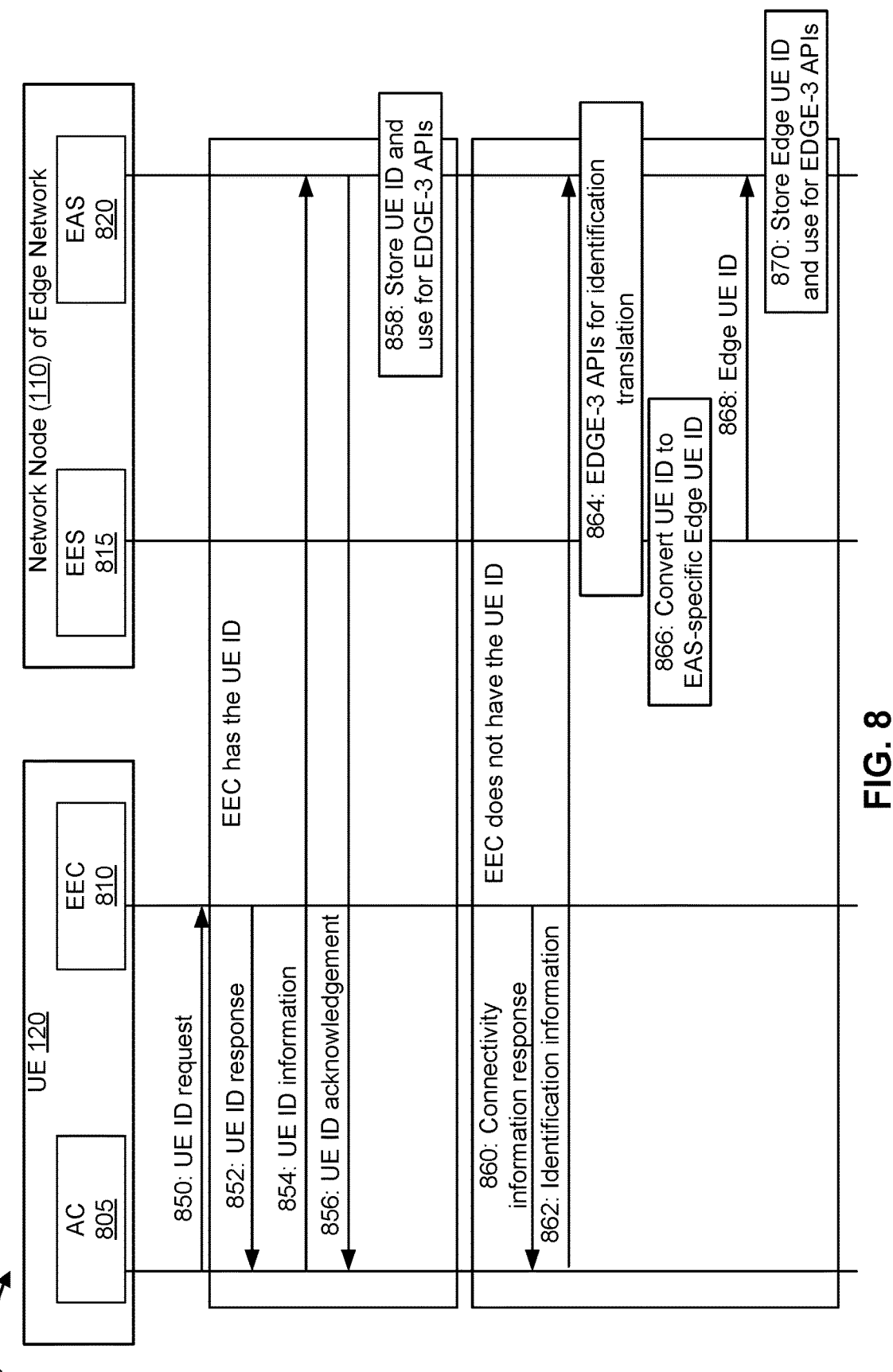

FIG. 8 is a diagram illustrating an example 800 associated with UE identification in an edge communications architecture, in accordance with the present disclosure. As shown in FIG. 8, an AC 805, an EEC 810, an EES 815, and an EAS 820 may communicate with one another. In some aspects, AC 805 and/or EEC 810 may be components or entities included in or associated with UE 120. In some aspects, EES 815 and EAS 820 may be components or entities included in or associated with a network node of an edge network, such as a network node 110 or other network entity.

As shown by reference number 850, AC 805 may transmit a UE identification request to EEC 810. For example, AC 805 may request (via an API of EEC 810) that EEC 810 provide a UE ID (e.g., a GPSI) to AC 805. In some aspects, EEC 810 may have the UE ID stored and available to provide to AC 805. In some aspects, EEC 810 may not have the UE ID stored and available to provide to AC 805. In some aspects, EEC 810 may obtain the UE ID based at least in part on a request from AC 805. For example, when EEC 810 does not have the UE ID stored and receives a request for the UE ID, EEC 810 may obtain the UE ID, as described in more detail herein.

As shown by reference number 852, based at least in part on EEC 810 having the UE ID available (e.g., stored), EEC 810 may transmit a response to AC 805 identifying the UE ID. For example, based at least in part on receiving the UE identification request, EEC 810 may provide a GPSI to AC 805. In this case, as shown by reference number 854 and 856, AC 805 may transmit identification information indicating the UE ID to EAS 820 and EAS 820 may store the UE ID. As shown by reference number 858, one or more network entities of the edge network (e.g., EAS 820 and EES 815 may use the UE ID to access an EDGE-3 API associated with the UE 120 (e.g., AC 805 and EEC 810)).

In contrast, as shown by reference number 860, based at least in part on EEC 810 not having the UE ID available, EEC 810 may provide connectivity information to AC 805 as a response to the request for the UE ID. For example, EEC 810 may provide, to AC 805, information identifying an IP address (e.g., a private IP address), a home public land mobile network (hPLMN) identifier (hPLMN ID), or a serving public land mobile network (PLMN) (serving PLMN) identifier (serving PLMN ID), among other examples. Additionally, or alternatively, AC 805 may determine the connectivity information without receiving the connectivity information from EEC 810. In some aspects, the connectivity information may be conveyed in a Connectivity Information type of information element. For example, the Connectivity Information type of information element may be configured to convey a PLMN identifier (PLMN ID), a service set identifier (SSID), a home PLMN or hPLMN ID (e.g., for non-roaming use), a serving PLMN ID (e.g., for roaming use, in which case the serving PLMN ID may be a visited PLMN ID (vPLMN ID)), a slice identifier, or an edge computing service provider (ECSP) identifier.

As shown by reference number 862, AC 805 may transmit identification information indicating the connectivity information to EAS 820. For example, AC 805 may provide information identifying the IP address, the hPLMN ID, or the serving PLMN ID, among other examples to EAS 820. In this way, connectivity information provided to identify UE 120 is updated using an hPLMN ID and/or serving PLMN ID to enable disambiguation of different MNOs in which UE 120 may be operating. As shown by reference number 864, EAS 820 uses the EDGE-3 API for identification translation. For example, rather than using a UE ID (e.g., as described with regards to reference number 858), EAS 820 may use the IP address, hPLMN ID, and/or serving PLMN ID. In this case, EES 815 may have the IP address translated to a UE ID associated with a correct core network for the UE 120 by using the hPLMN ID and the serving PLMN ID (e.g., which enables functionality in both non-roaming and roaming scenarios). EES 815 may convert the UE ID to an EAS-specific edge UE ID and may provide the edge UE ID to EAS 820 for subsequent use, as shown by reference numbers 866 and 868. As shown by reference number 870, a network node of the edge network (e.g., EAS 820 and/or EES 815) may then use the edge UE ID to access the EDGE-3 API associated with the UE 120 (e.g., AC 805 and/or EEC 810). In this way, UE 120 and the network node of the edge network enable communication in cases when EEC 810 has the UE ID available and when EEC 810 does not have the UE ID available.

As indicated above, FIG. 8 is provided as an example. Other examples may differ from what is described with respect to FIG. 8.

Figure 9:
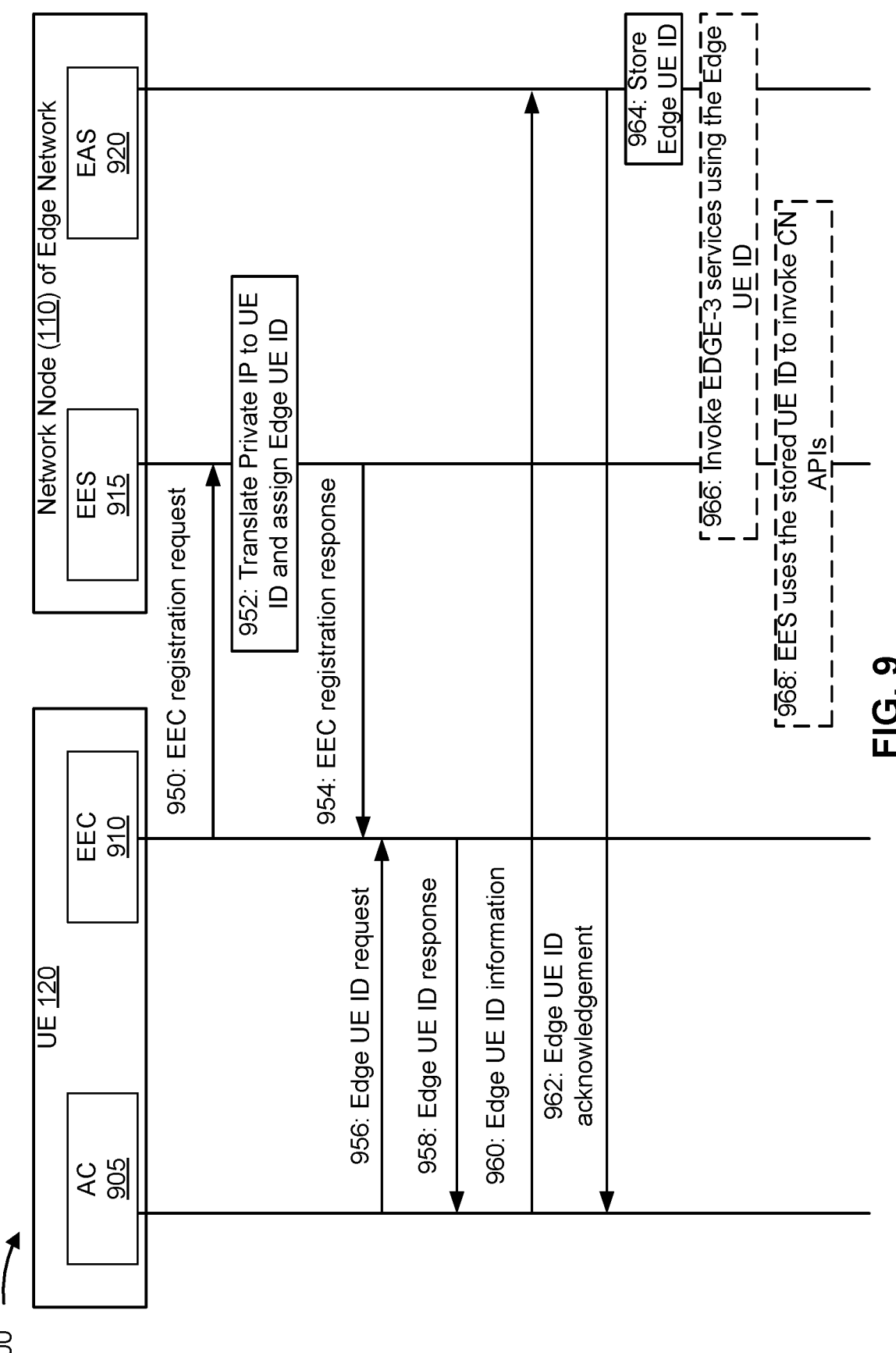

FIG. 9 is a diagram illustrating an example 900 associated with UE identification in an edge communications architecture, in accordance with the present disclosure. As shown in FIG. 9, an AC 905, an EEC 910, an EES 915, and an EAS 920 may communicate with one another. In some aspects, AC 905 and/or EEC 910 may be components or entities included in or associated with UE 120. In some aspects, EES 915 and EAS 920 may be components or entities included in or associated with a network node of an edge network, such as a network node 110 or other network entity.

As shown by reference number 950, EEC 910 may transmit (via an API call to an EDGE-1 interface associated with EES 915) an EEC registration request to EES 915. For example, EEC 910 may provide connectivity information, such as a private IP address, an hPLMN ID, or a serving PLMN ID, among other examples to EES 915. Additionally, or alternatively, a new EES service may be instantiated, which may trigger EES 915 to translate a private IP into a UE ID and assign an edge UE ID, as described herein. As shown by reference numbers 952 and 954, EES 915 may translate the private IP address to a UE ID, assign an edge UE ID based at least in part on the UE ID, and provide an EEC registration response to EEC 910 to indicate the edge UE ID. For example, EES 915 may use the hPLMN ID and the serving PLMN ID to identify an MNO associated with a UE 120 (e.g., associated with AC 905 and EEC 910) and translate the private IP into a UE ID based at least in part on identifying the MNO. In some aspects, EES 915 may associate a time limitation with the edge UE ID. For example, EES 915 may cause the edge UE ID to expire (e.g., become not usable for communication and invoking EDGE-3 services) after a period of time, which may improve information security by reducing tracking of UE 120.

In this way, EEC 810 may obtain an edge UE ID (e.g., or, in another example, a UE ID when EES 915 forgoes assignment of the edge UE ID) for subsequent use, which may enable dynamic private IP addresses to be allocated without causing issues to communication between the network node of the edge network and UE 120. Moreover, EES 915 can optimize allocation of the edge UE ID, as described herein, which may enable optimization by using a single core network subscription for a plurality of EASs 920.

As shown by reference numbers 956 and 958, after EEC 910 has received the edge UE ID, AC 905 may request the edge UE ID and receive a response indicating the edge UE ID. For example, AC 905 may transmit a request for identification information and may receive the edge UE ID as a response. In this case, as shown by reference numbers 960 and 962, AC 905 may transmit identification information to EAS 920 and receive an acknowledgement of the identification information from EAS 920. For example, AC 905 may transmit an indication of the edge UE ID. As shown by reference numbers 964, 966, and 968, EAS 920 may store the edge UE ID, EAS 920 and/or EES 915 may access EDGE-3 services using the edge UE ID, and EES 915 may use the UE ID and/or edge UE ID to access a set of APIs of a core network associated with UE 120.

As indicated above, FIG. 9 is provided as an example. Other examples may differ from what is described with respect to FIG. 9.

Figure 10:
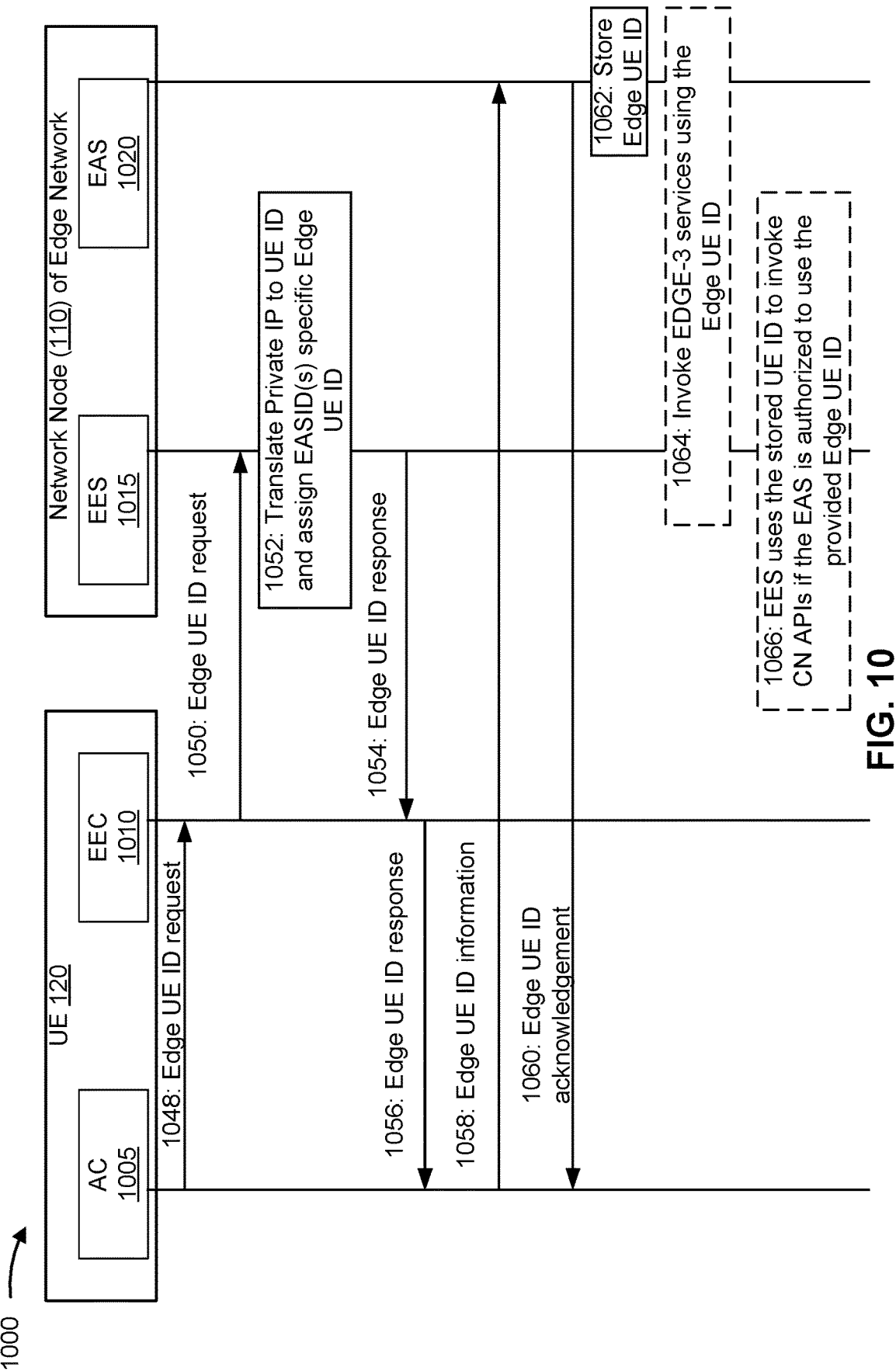

FIG. 10 is a diagram illustrating an example 1000 associated with UE identification in an edge communications architecture, in accordance with the present disclosure. As shown in FIG. 10, an AC 1005, an EEC 1010, an EES 1015, and an EAS 1020 may communicate with one another. In some aspects, AC 1005 and/or EEC 1010 may be components or entities included in or associated with UE 120. In some aspects, EES 1015 and EAS 1020 may be components or entities included in or associated with a network node of an edge network, such as a network node 110 or other network entity.

As shown by reference number 1048, AC 1005 may transmit a request for EEC 1010 to provide an edge UE ID for UE 120. For example, AC 1005 may transmit an EAS ID request to cause EEC 1010 to provide an edge UE ID for UE 120. The request from the AC 1005 may include a list of EASs 1020 associated with the request. As shown by reference number 1050, EEC 1010 may transmit a request for the edge UE ID to EES 1015 based at least in part on receiving the request from AC 1005. For example, EEC 1010 may provide connectivity information, such as a private IP address, an hPLMN ID, a serving PLMN ID, or the list of EASs 1020 associated with the UE ID request, among other examples to EES 1015. In this case, as shown by reference numbers 1052 and 1054, EES 1015 may translate the private IP address to a UE ID, assign an EAS ID specific edge UE ID (e.g., an edge UE ID specific to the EAS 1020) based at least in part on the UE ID, and provide an EEC registration response to EEC 1010 to indicate the edge UE ID. For example, EES 1015 may use the hPLMN ID and the serving PLMN ID to identify an MNO associated with a UE 120 (e.g., associated with AC 1005 and EEC 1010) and translate the private IP into a UE ID based at least in part on identifying the MNO. In some aspects, EES 1015 may use an AC identifier to assign the edge UE ID on a per AC basis. For example, when a UE 120 includes a plurality of ACs 1005, the edge UE ID request may include an AC identifier indicating (e.g., including a field conveying a string, including an index value for a lookup table, or including another type of value, among other examples) the AC 1005, of the plurality of ACs 1005, with which the request is associated. In this case, EES 1015 may determine the edge UE ID for the AC 1005 (and other edge UE IDs for other ACs 1005).

As shown by reference number 1056, after EEC 1010 has received the edge UE ID, EEC 1010 may provide a response to the edge UE ID request from AC 1005. For example, EEC 1010 may provide identification information indicating the edge UE ID as a response. In this case, as shown by reference numbers 1058 and 1060, AC 1005 may transmit identification information to EAS 1020 and receive an acknowledgement of the identification information from EAS 1020. For example, AC 1005 may transmit an indication of the edge UE ID. As shown by reference numbers 1062, 1064, and 1066, EAS 1020 may store the edge UE ID, EAS 1020 and/or EES 1015 may access EDGE-3 services using the edge UE ID, and EES 1015 may use the UE ID and/or edge UE ID to access a set of APIs of a core network associated with UE 120. In some aspects, the private IP address can be an IPv4 address or an IPv6 address.

As indicated above, FIG. 10 is provided as an example. Other examples may differ from what is described with respect to FIG. 10.

Figure 11:
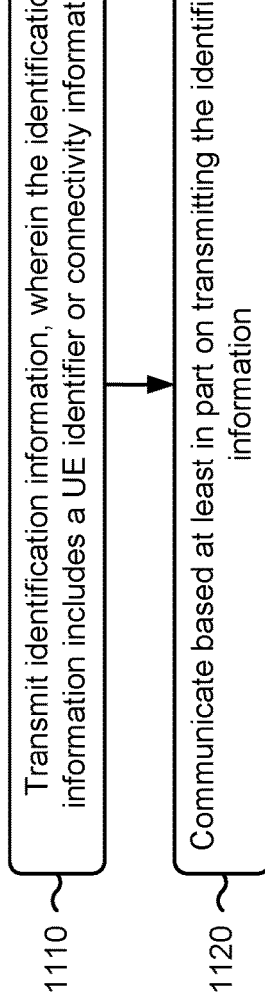
FIGS. 11-12 are diagrams illustrating example processes associated with UE identification in an edge communications architecture, in accordance with the present disclosure.
Figure 11:

FIG. 11 is a diagram illustrating an example process 1100 performed, for example, by a UE, in accordance with the present disclosure. Example process 1100 is an example where the UE (e.g., UE 120) performs operations associated with UE identification.

As shown in FIG. 11, in some aspects, process 1100 may include transmitting identification information, wherein the identification information includes a UE identifier or connectivity information (block 1110). For example, the UE (e.g., using communication manager 140 and/or transmission component 1304, depicted in FIG. 13) may transmit identification information, wherein the identification information includes a UE identifier or connectivity information, as described above with regard to FIGS. 6-10.

As further shown in FIG. 11, in some aspects, process 1100 may include communicating based at least in part on transmitting the identification information (block 1120). For example, the UE (e.g., using communication manager 140 and/or reception component 1302 and/or transmission component 1304, depicted in FIG. 13) may communicate based at least in part on transmitting the identification information, as described above with regard to FIGS. 6-10.

Process 1100 may include additional aspects, such as any single aspect or any combination of aspects described below and/or in connection with one or more other processes described elsewhere herein.

In a first aspect, process 1100 includes obtaining the UE identifier, and transmitting the identification information comprises transmitting an indication of the UE identifier based at least in part on obtaining the UE identifier.

In a second aspect, alone or in combination with the first aspect, the UE identifier is unavailable, and transmitting the identification information comprises transmitting an indication of the connectivity information based at least in part on the UE identifier being unavailable.

In a third aspect, alone or in combination with one or more of the first and second aspects, process 1100 includes providing the connectivity information to an edge enabler server, and receiving, based at least in part on providing the connectivity information, a UE identifier.

In a fourth aspect, alone or in combination with one or more of the first through third aspects, the UE identifier includes an edge UE identifier.

In a fifth aspect, alone or in combination with one or more of the first through fourth aspects, the edge UE identifier is valid for a period of time constrained by a time interval.

In a sixth aspect, alone or in combination with one or more of the first through fifth aspects, the edge UE identifier is associated with the UE.

In a seventh aspect, alone or in combination with one or more of the first through sixth aspects, transmitting the identification information comprises transmitting the identification information via an EDGE-5 interface.

In an eighth aspect, alone or in combination with one or more of the first through seventh aspects, transmitting the identification information comprises transmitting the identification information to an edge application server by an application client on the UE.

In a ninth aspect, alone or in combination with one or more of the first through eighth aspects, process 1100 includes receiving a request for the identification information via an application programming interface, and transmitting the identification information comprises transmitting the identification information based at least in part on receiving the request.

In a tenth aspect, alone or in combination with one or more of the first through ninth aspects, transmitting the identification information comprises transmitting a connectivity information type information element that includes the identification information.

In an eleventh aspect, alone or in combination with one or more of the first through tenth aspects, the connectivity information type information element includes at least one of an internet protocol address, a home public land mobile network identifier, a serving public land mobile network identifier, a slice identifier, a UE identifier such as GPSI, or an edge computing service provider identifier.

In a twelfth aspect, alone or in combination with one or more of the first through eleventh aspects, the identification information includes information identifying a serving public land mobile network.

In a thirteenth aspect, alone or in combination with one or more of the first through twelfth aspects, process 1100 includes exposing an identification information service via an edge-1 interface, and transmitting the identification information comprises transmitting the identification information based at least in part on exposing the identification information service.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
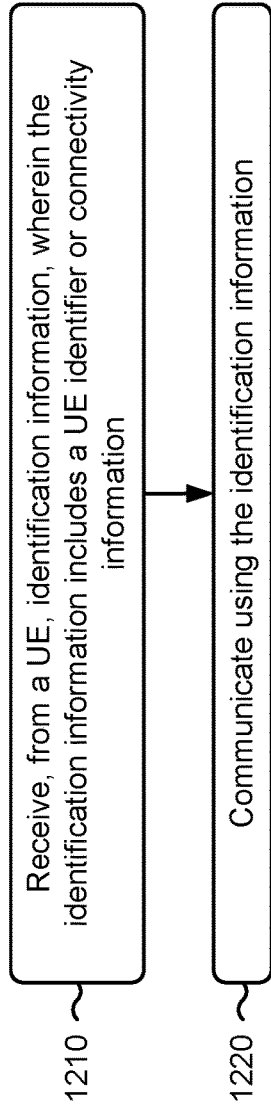

FIG. 12 is a diagram illustrating an example process 1200 performed, for example, by a network node, in accordance with the present disclosure. Example process 1200 is an example where the network node (e.g., network node 110 or the network nodes described with regard to FIGS. 4-10) performs operations associated with UE identification.

As shown in FIG. 12, in some aspects, process 1200 may include receiving, from a UE, identification information, wherein the identification information includes a UE identifier or connectivity information (block 1210). For example, the network node (e.g., using communication manager 150 and/or reception component 1402, depicted in FIG. 14) may receive, from a UE, identification information, wherein the identification information includes a UE identifier or connectivity information, as described above with regard to FIGS. 6-10.

As further shown in FIG. 12, in some aspects, process 1200 may include communicating using the identification information (block 1220). For example, the network node (e.g., using communication manager 150 and/or reception component 1402 and/or transmission component 1404, depicted in FIG. 14) may communicate using the identification information, as described above with regard to FIGS. 6-10.

Process 1200 may include additional aspects, such as any single aspect or any combination of aspects described below and/or in connection with one or more other processes described elsewhere herein.

In a first aspect, receiving the identification information comprises receiving an indication of the UE identifier.

In a second aspect, alone or in combination with the first aspect, the UE identifier is unavailable, and receiving the identification information comprises receiving an indication of the connectivity information based at least in part on the UE identifier being unavailable.

In a third aspect, alone or in combination with one or more of the first and second aspects, process 1200 includes receiving the connectivity information from an edge enabler client, and transmitting, based at least in part on receiving the connectivity information, a UE identifier.

In a fourth aspect, alone or in combination with one or more of the first through third aspects, the UE identifier includes an edge UE identifier.

In a fifth aspect, alone or in combination with one or more of the first through fourth aspects, the edge UE identifier is valid for a period of time constrained by a time interval.

In a sixth aspect, alone or in combination with one or more of the first through fifth aspects, the edge UE identifier is associated with the UE.

In a seventh aspect, alone or in combination with one or more of the first through sixth aspects, receiving the identification information comprises receiving the identification information from an application client on the UE.

In an eighth aspect, alone or in combination with one or more of the first through seventh aspects, process 1200 includes transmitting a request for the identification information via an application programming interface, and receiving the identification information comprises receiving the identification information based at least in part on receiving the request.

In a ninth aspect, alone or in combination with one or more of the first through eighth aspects, receiving the identification information comprises receiving a connectivity information type information element that includes the identification information.

In a tenth aspect, alone or in combination with one or more of the first through ninth aspects, the connectivity information type information element includes at least one of an internet protocol address, a home public land mobile network identifier, a serving public land mobile network identifier, a slice identifier, a UE identifier such as GPSI, or an edge computing service provider identifier.

In an eleventh aspect, alone or in combination with one or more of the first through tenth aspects, the identification information includes information identifying a serving public land mobile network.

In a twelfth aspect, alone or in combination with one or more of the first through eleventh aspects, process 1200 includes accessing an identification information service via an edge-1 interface, and receiving the identification information comprises receiving the identification information based at least in part on accessing the identification information service.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
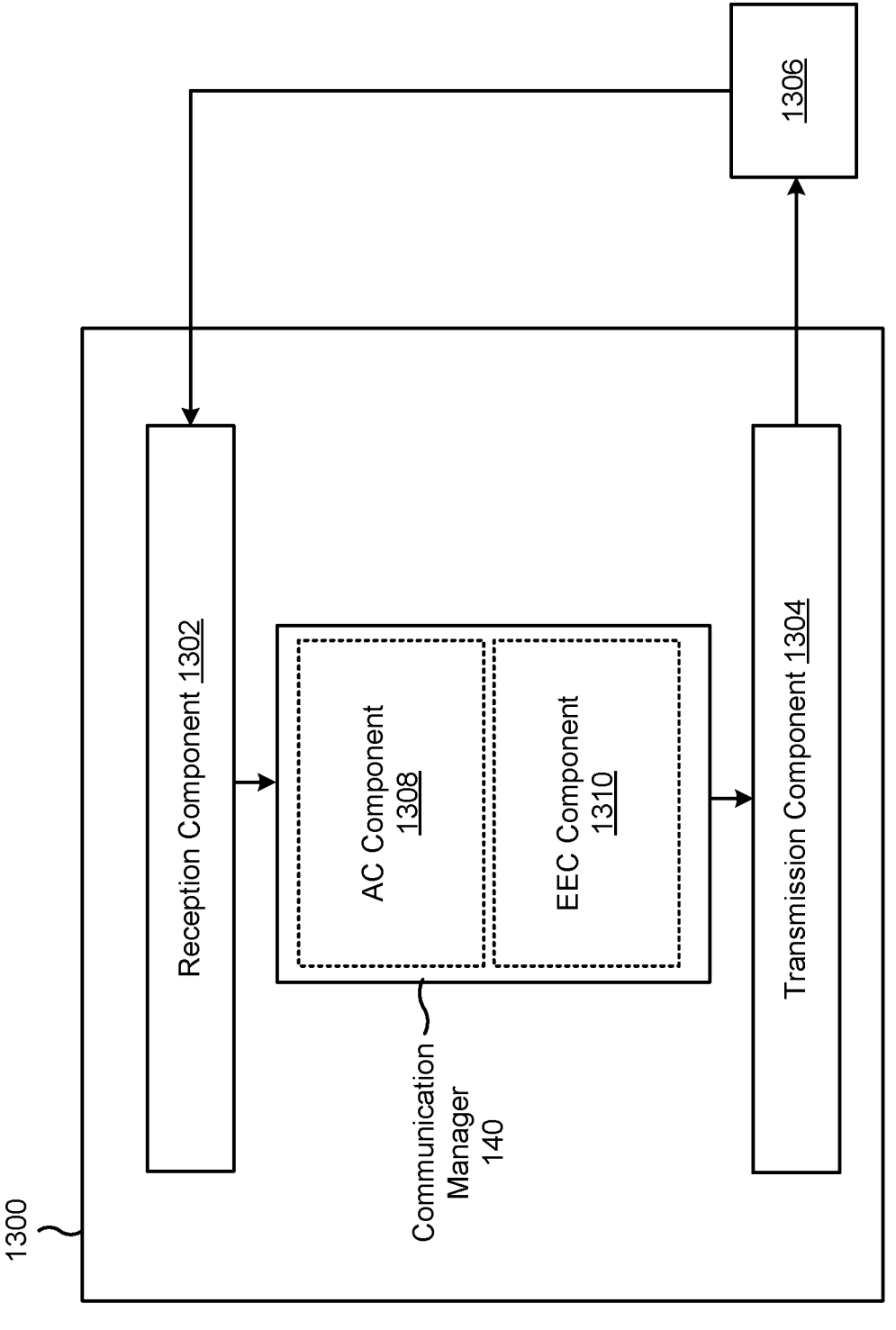
FIGS. 13-14 are diagrams of example apparatuses for wireless communication, in accordance with the present disclosure.

FIG. 13 is a diagram of an example apparatus 1300 for wireless communication. The apparatus 1300 may be a UE, or a UE may include the apparatus 1300. In some aspects, the apparatus 1300 includes a reception component 1302 and a transmission component 1304, which may be in communication with one another (for example, via one or more buses and/or one or more other components). As shown, the apparatus 1300 may communicate with another apparatus 1306 (such as a UE, a base station, or another wireless communication device) using the reception component 1302 and the transmission component 1304. As further shown, the apparatus 1300 may include the communication manager 140. The communication manager 140 may include one or more of an AC component 1308 or an EEC component 1310, among other examples.

In some aspects, the apparatus 1300 may be configured to perform one or more operations described herein in connection with FIGS. 6-10. Additionally, or alternatively, the apparatus 1300 may be configured to perform one or more processes described herein, such as process 1100 of FIG. 11 or process 1600 of FIG. 16. In some aspects, the apparatus 1300 and/or one or more components shown in FIG. 13 may include one or more components of the UE described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1306. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the UE described in connection with FIG. 2.

The transmission component 1304 may transmit communications, such as reference signals, control information, data communications, or a combination thereof, to the apparatus 1306. In some aspects, one or more other components of the apparatus 1300 may generate communications and may provide the generated communications to the transmission component 1304 for transmission to the apparatus 1306. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1306. In some aspects, the transmission component 1304 may include one or more antennas, a modem, a modulator, a transmit MIMO processor, a transmit processor, a controller/processor, a memory, or a combination thereof, of the UE described in connection with FIG. 2. In some aspects, the transmission component 1304 may be co-located with the reception component 1302 in a transceiver.

The transmission component 1304 may transmit identification information, wherein the identification information includes a UE identifier or connectivity information. The reception component 1302 and/or the transmission component 1304 may communicate based at least in part on transmitting the identification information.

The AC component 1308 and/or the EEC component 1310 may obtain the UE identifier. The AC component 1308 and/or the EEC component 1310 may provide the connectivity information to an edge enabler server. The reception component 1302 may receive, based at least in part on providing the connectivity information, a UE identifier. The reception component 1302 may receive a request for the identification information via an application programming interface. The AC component 1308 and/or the EEC component 1310 may expose an identification information service via an edge-1 interface.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

Figure 14:
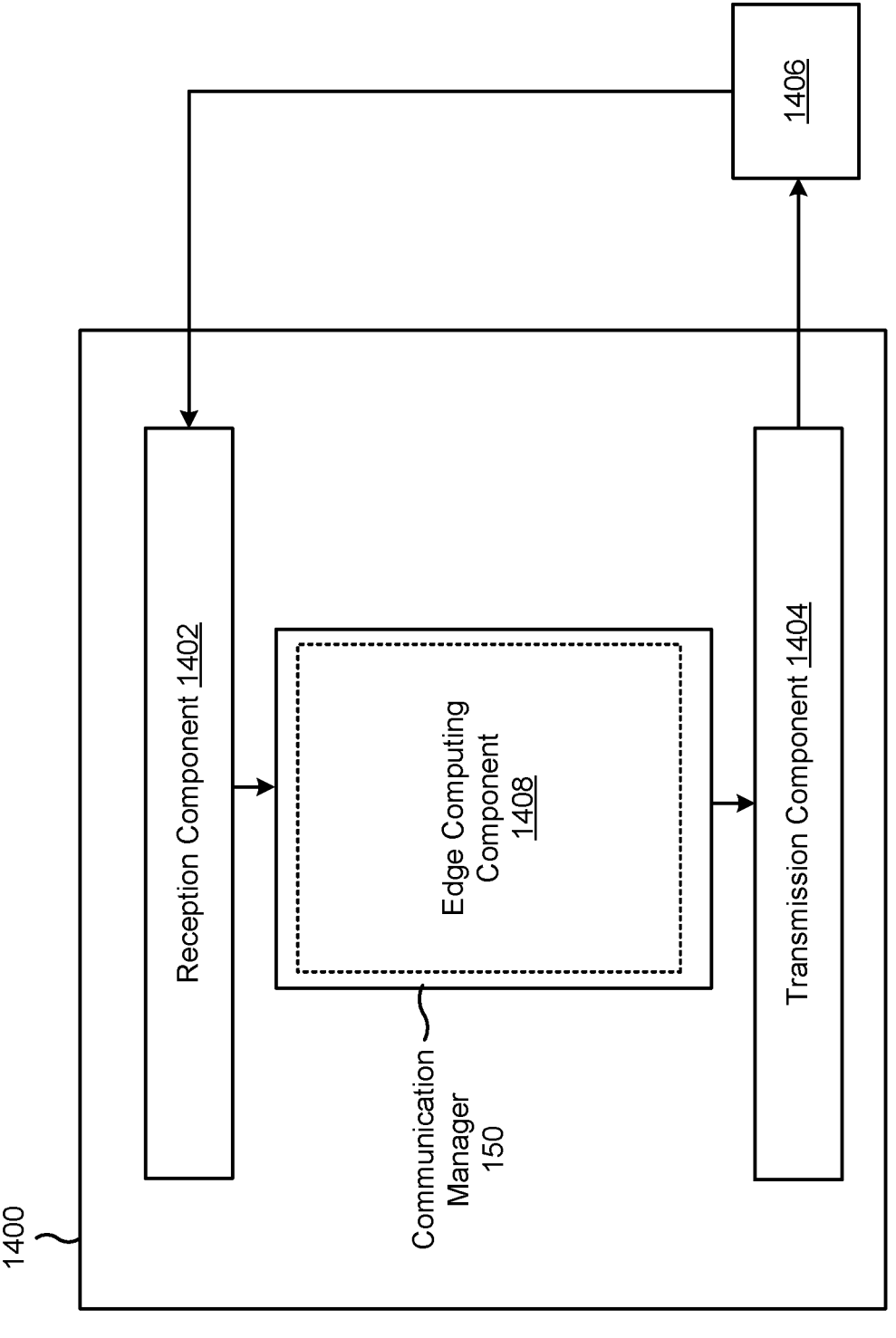

FIG. 14 is a diagram of an example apparatus 1400 for wireless communication. The apparatus 1400 may be a network node, or a network node may include the apparatus 1400. In some aspects, the apparatus 1400 includes a reception component 1402 and a transmission component 1404, which may be in communication with one another (for example, via one or more buses and/or one or more other components). As shown, the apparatus 1400 may communicate with another apparatus 1406 (such as a UE, a base station, network node, network entity, or another wireless communication device) using the reception component 1402 and the transmission component 1404. As further shown, the apparatus 1400 may include the communication manager 150. The communication manager 150 may include a edge computing component 1408, among other examples.

In some aspects, the apparatus 1400 may be configured to perform one or more operations described herein in connection with FIGS. 6-10. Additionally, or alternatively, the apparatus 1400 may be configured to perform one or more processes described herein, such as process 1200 of FIG. 12 or process 1500 of FIG. 15. In some aspects, the apparatus 1400 and/or one or more components shown in FIG. 14 may include one or more components of the network node described in connection with FIG. 2. Additionally, or alternatively, one or more components shown in FIG. 14 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1402 may receive communications, such as reference signals, control information, data communications, or a combination thereof, from the apparatus 1406. The reception component 1402 may provide received communications to one or more other components of the apparatus 1400. In some aspects, the reception component 1402 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1400. In some aspects, the reception component 1402 may include one or more antennas, a modem, a demodulator, a MIMO detector, a receive processor, a controller/processor, a memory, or a combination thereof, of the network node described in connection with FIG. 2.

The transmission component 1404 may transmit communications, such as reference signals, control information, data communications, or a combination thereof, to the apparatus 1406. In some aspects, one or more other components of the apparatus 1400 may generate communications and may provide the generated communications to the transmission component 1404 for transmission to the apparatus 1406. In some aspects, the transmission component 1404 may perform signal processing on the generated communications (such as filtering, amplification, modulation, digital-to-analog conversion, multiplexing, interleaving, mapping, or encoding, among other examples), and may transmit the processed signals to the apparatus 1406. In some aspects, the transmission component 1404 may include one or more antennas, a modem, a modulator, a transmit MIMO processor, a transmit processor, a controller/processor, a memory, or a combination thereof, of the network node described in connection with FIG. 2. In some aspects, the transmission component 1404 may be co-located with the reception component 1402 in a transceiver.

The reception component 1402 may receive, from a UE, identification information, wherein the identification information includes a UE identifier or connectivity information. The reception component 1402 and/or the transmission component 1404 may communicate using the identification information.

The reception component 1402 may receive the connectivity information from an edge enabler client. The transmission component 1404 may transmit, based at least in part on receiving the connectivity information, a UE identifier. The transmission component 1404 may transmit a request for the identification information via an application programming interface. The edge computing component 1408 may access an identification information service via an edge-1 interface.

The number and arrangement of components shown in FIG. 14 are provided as an example. In practice, there may be additional components, fewer components, different components, or differently arranged components than those shown in FIG. 14. Furthermore, two or more components shown in FIG. 14 may be implemented within a single component, or a single component shown in FIG. 14 may be implemented as multiple, distributed components. Additionally, or alternatively, a set of (one or more) components shown in FIG. 14 may perform one or more functions described as being performed by another set of components shown in FIG. 14.

FIG. 15 is a diagram illustrating an example process 1500 performed, for example, by a UE, in accordance with the present disclosure. Example process 1500 is an example where the UE (e.g., UE 120) performs operations associated with UE identification in edge communications.

As shown in FIG. 15, in some aspects, process 1500 may include transmitting a request for identification information, the request including at least one identifier of the UE (block 1510). For example, the UE (e.g., using transmission component 1304 and/or communication manager 140, depicted in FIG. 13) may transmit a request for identification information, the request including at least one identifier of the UE, as described above.

As further shown in FIG. 15, in some aspects, process 1500 may include receiving, as a response to the request for identification information, a response message including the identification information, the identification information including an edge UE identifier assigned to the UE based at least in part on the request for the identification information (block 1520). For example, the UE (e.g., using reception component 1302 and/or communication manager 140, depicted in FIG. 13) may receive, as a response to the request for identification information, a response message including the identification information, the identification information including an edge UE identifier assigned to the UE based at least in part on the request for the identification information, as described above.

As further shown in FIG. 15, in some aspects, process 1500 may include communicating based at least in part on receiving the identification information (block 1530). For example, the UE (e.g., using reception component 1302, transmission component 1304, and/or communication manager 140, depicted in FIG. 13) may communicate based at least in part on receiving the identification information, as described above.

Process 1500 may include additional aspects, such as any single aspect or any combination of aspects described below and/or in connection with one or more other processes described elsewhere herein.

In a first aspect, process 1500 includes transmitting the identification information, wherein the identification information includes the edge UE identifier, and wherein the one or more processors, to communicate based at least in part on receiving the identification information, are configured to communicate based at least in part on transmitting the identification information.

In a second aspect, alone or in combination with the first aspect, process 1500 includes transmitting connectivity information to an edge enabler server, and receiving, based at least in part on providing the connectivity information, the edge UE identifier.

In a third aspect, alone or in combination with one or more of the first and second aspects, the edge UE identifier is valid for a period of time constrained by a time interval.

In a fourth aspect, alone or in combination with one or more of the first through third aspects, process 1500 includes transmitting the identification information via an EDGE-5 interface.

In a fifth aspect, alone or in combination with one or more of the first through fourth aspects, process 1500 includes transmitting the identification information to an edge application server by an application client on the UE.

In a sixth aspect, alone or in combination with one or more of the first through fifth aspects, process 1500 includes receiving a request for the identification information via an application programming interface, and transmitting the identification information based at least in part on receiving the request.

In a seventh aspect, alone or in combination with one or more of the first through sixth aspects, process 1500 includes transmitting a connectivity information type information element that includes the identification information.

In an eighth aspect, alone or in combination with one or more of the first through seventh aspects, the connectivity information type information element includes at least one of an internet protocol address, a home public land mobile network identifier, a serving public land mobile network identifier, a slice identifier, a UE identifier such as GPSI, or an edge computing service provider identifier.

In a ninth aspect, alone or in combination with one or more of the first through eighth aspects, the identification information includes information identifying a serving public land mobile network.

In a tenth aspect, alone or in combination with one or more of the first through ninth aspects, process 1500 includes exposing an identification information service via an edge-1 interface, and transmitting the identification information based at least in part on exposing the identification information service.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

FIG. 16 is a diagram illustrating an example process 1600 performed, for example, by a network node, in accordance with the present disclosure. Example process 1600 is an example where the network node (e.g., network node 110) performs operations associated with UE identification in edge communications.

As shown in FIG. 16, in some aspects, process 1600 may include receiving a request for identification information, the request including at least one identifier of a UE (block 1610). For example, the network node (e.g., using reception component 1402 and/or communication manager 150, depicted in FIG. 14) may receive a request for identification information, the request including at least one identifier of a UE, as described above.

As further shown in FIG. 16, in some aspects, process 1600 may include transmitting, as a response to the request for identification information, a response message including the identification information, the identification information including an edge UE identifier assigned to the UE based at least in part on the request for the identification information (block 1620). For example, the network node (e.g., using transmission component 1404 and/or communication manager 150, depicted in FIG. 14) may transmit, as a response to the request for identification information, a response message including the identification information, the identification information including an edge UE identifier assigned to the UE based at least in part on the request for the identification information, as described above.

As further shown in FIG. 16, in some aspects, process 1600 may include communicating based at least in part on transmitting the identification information (block 1630). For example, the network node (e.g., using reception component 1402, transmission component 1404, and/or communication manager 150, depicted in FIG. 14) may communicate based at least in part on transmitting the identification information, as described above.

Process 1600 may include additional aspects, such as any single aspect or any combination of aspects described below and/or in connection with one or more other processes described elsewhere herein.

In a first aspect, process 1600 includes receiving, from the UE, the identification information, wherein the identification information includes the edge UE identifier, and wherein the one or more processors, to communicate based at least in part on transmitting the identification information, are configured to communicate based at least in part on receiving the identification information.

In a second aspect, alone or in combination with the first aspect, process 1600 includes receiving the connectivity information from an edge enabler client, and transmitting, based at least in part on receiving the connectivity information, the edge UE identifier.

In a third aspect, alone or in combination with one or more of the first and second aspects, the edge UE identifier is valid for a period of time constrained by a time interval.

In a fourth aspect, alone or in combination with one or more of the first through third aspects, process 1600 includes receiving the identification information from an application client on the UE.

In a fifth aspect, alone or in combination with one or more of the first through fourth aspects, process 1600 includes transmitting a request for the identification information via an application programming interface, and receiving the identification information based at least in part on receiving the request.

In a sixth aspect, alone or in combination with one or more of the first through fifth aspects, process 1600 includes receiving a connectivity information type information element that includes the identification information.

In a seventh aspect, alone or in combination with one or more of the first through sixth aspects, the connectivity information type information element includes at least one of an internet protocol address, a home public land mobile network identifier, a serving public land mobile network identifier, a slice identifier, a UE identifier such as GPSI, or an edge computing service provider identifier.

In an eighth aspect, alone or in combination with one or more of the first through seventh aspects, the identification information includes information identifying a serving public land mobile network.

In a ninth aspect, alone or in combination with one or more of the first through eighth aspects, process 1600 includes accessing an identification information service via an edge-1 interface, and receiving the identification information based at least in part on accessing the identification information service.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

The following provides an overview of some Aspects of the present disclosure:

Aspect 1: A method of wireless communication performed by a user equipment (UE), comprising: transmitting identification information, wherein the identification information includes a UE identifier or connectivity information; and communicating based at least in part on transmitting the identification information.

Aspect 2: The method of Aspect 1, wherein the UE includes an edge enabler client.

Aspect 3: The method of any of Aspects 1 to 2, further comprising: transmit the identification information, wherein the identification information includes the edge UE identifier; and communicating based at least in part on transmitting the identification information.

Aspect 4: The method of any of Aspects 1 to 3, the received edge UE identifier is valid for a period of time constrained by a time interval.

Aspect 5: The method of any of Aspects 1 to 4, further comprising: transmitting the identification information via an EDGE-5 interface to an application client.

Aspect 6: The method of any of Aspects 1 to 5, further comprising transmitting the identification information to an edge application server by an application client on the UE.

Aspect 7: The method of any of Aspects 1 to 6, further comprising: receiving a request for the identification information via an application programming interface; and transmitting the identification information based at least in part on receiving the request.

Aspect 8: The method of any of Aspects 1 to 7, further comprising transmitting a particular identifier of the UE to a network node; and receiving, based at least in part on transmitting the particular identifier of the UE, the edge UE identifier .

Aspect 9: The method of any of Aspects 1 to 8, wherein the particular identifier of the UE includes at least one of an internet protocol address, a home public land mobile network identifier, a serving public land mobile network identifier, a slice identifier, a UE identifier, a generic public subscription identifier, or an edge computing service provider identifier.

Aspect 10: The method of any of Aspects 1 to 9, wherein the edge UE identifier is valid for use by a pre-configured set of applications.

Aspect 11: The method of any of Aspects 1 to 10, wherein the request for identification information is transmitted in connection with an edge enabler client registration request, and wherein the response is received in connection with an edge enabler client registration response.

Aspect 12: A method of wireless communication performed by a network node, comprising: receiving, from a user equipment (UE), identification information, wherein the identification information includes a UE identifier or connectivity information; and communicating using the identification information.

Aspect 13: The method of Aspect 12, wherein the network node is an edge enabler server.

Aspect 14: The method of any of Aspects 12 to 13, further comprising: receiving, from the UE, the identification information, wherein the identification information includes the edge UE identifier; and communicating based at least in part on receiving the identification information.

Aspect 15: The method of any of Aspects 12 to 14, further comprising: receiving a particular identifier of the UE from the UE; and transmitting, based at least in part on receiving the particular identifier of the UE, the edge UE identifier.

Aspect 16: The method of any of Aspects 12 to 15, wherein the transmitted edge UE identifier is valid for a period of time constrained by a time interval.

Aspect 17: The method of any of Aspects 12 to 16, further comprising: receiving a particular identifier of the UE from an edge enabler client on the UE.

Aspect 18: The method of any of Aspects 12 to 17, further comprising: receiving a request for the identification information via an application programming interface; and transmitting the identification information based at least in part on receiving the request.

Aspect 19: The method of any of Aspects 12 to 18, further comprising receiving the identifier of the UE included as part of a connectivity information type information element.

Aspect 20: The method of any of Aspects 12 to 19, wherein a particular identifier of the UE includes at least one of an internet protocol address, a home public land mobile network identifier, a serving public land mobile network identifier, a slice identifier, a UE identifier, a generic public subscription identifier, or an edge computing service provider identifier.

Aspect 21: The method of any of Aspects 12 to 20, wherein the transmitted edge UE identifier is valid for use by one or more pre-configured applications.

Aspect 22: The method of any of Aspects 12 to 21, wherein the request for identification information is received in connection with an edge enabler client registration request, and wherein the response is transmitted in connection with an edge enabler client registration response.

Aspect 23: An apparatus for wireless communication at a device, comprising a processor; memory coupled with the processor; and instructions stored in the memory and executable by the processor to cause the apparatus to perform the method of one or more of Aspects 1-22.

Aspect 24: A device for wireless communication, comprising a memory and one or more processors coupled to the memory, the one or more processors configured to perform the method of one or more of Aspects 1-22.

Aspect 25: An apparatus for wireless communication, comprising at least one means for performing the method of one or more of Aspects 1-22.

Aspect 26: A non-transitory computer-readable medium storing code for wireless communication, the code comprising instructions executable by a processor to perform the method of one or more of Aspects 1-22.

Aspect 27: A non-transitory computer-readable medium storing a set of instructions for wireless communication, the set of instructions comprising one or more instructions that, when executed by one or more processors of a device, cause the device to perform the method of one or more of Aspects 1-22.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   memory; and
   one or more processors, coupled to the memory, configured to:
      transmit, by the UE, a request for identification information, the request including at least one private internet protocol (IP) address of the UE, and the request including a list of edge application servers (EASs) associated with the request;
      receive, as a response to the request for identification information, a response message including the identification information, the identification information including an edge UE identifier assigned to the UE using the private IP address of the UE; and
      communicate based at least in part on receiving the identification information.

2. The UE of claim 1, wherein the UE includes an edge enabler client.

3. The UE of claim 1, wherein the one or more processors are further configured to:
   transmit the identification information, wherein the identification information includes the edge UE identifier; and
   wherein the one or more processors, to communicate based at least in part on receiving the identification information, are configured to:
      communicate based at least in part on transmitting the identification information.

4. The UE of claim 1, wherein the received edge UE identifier is valid for a period of time constrained by a time interval.

5. The UE of claim 1, wherein the one or more processors are further configured to:

transmit the identification information via an EDGE-5 interface to an application client.

6. The UE of claim 1, wherein the one or more processors are further configured to:

transmit the identification information to an edge application server by an application client on the UE.

7. The UE of claim 1, wherein the one or more processors are further configured to:

receive a request for the identification information via an application programming interface; and transmit the identification information based at least in part on receiving the request.

8. The UE of claim 1, wherein the one or more processors are further configured to:

transmit a particular identifier of the UE to a network node; and receive, based at least in part on transmitting the particular identifier of the UE, the edge UE identifier.

9. The UE of claim 8, wherein the particular identifier of the UE includes at least one of an internet protocol address, a home public land mobile network identifier, a serving public land mobile network identifier, a slice identifier, a UE identifier, a generic public subscription identifier, or an edge computing service provider identifier.

10. The UE of claim 1, wherein the edge UE identifier is valid for use by a pre-configured set of applications.

11. The UE of claim 1, wherein the request for identification information is transmitted in connection with an edge enabler client registration request, and wherein the response is received in connection with an edge enabler client registration response.

12. A network node for wireless communication, comprising:

memory; and one or more processors, coupled to the memory, configured to:

receive, from a user equipment (UE), a request for identification information, the request including at least one private internet protocol (IP) address of the UE, and the request including a list of edge application servers (EASs) associated with the request;

transmit, as a response to the request for identification information, a response message including the identification information, the identification information including an edge UE identifier assigned to the UE using the private IP address of the UE; and communicate based at least in part on transmitting the identification information.

13. The network node of claim 12, wherein the network node is an edge enabler server.

14. The network node of claim 12, wherein the one or more processors are further configured to:

receive, from the UE, the identification information, wherein the identification information includes the edge UE identifier; and wherein the one or more processors, to communicate based at least in part on transmitting the identification information, are configured to:

communicate based at least in part on receiving the identification information.

15. The network node of claim 12, wherein the one or more processors are further configured to:

receive a particular identifier of the UE from the UE; and transmit, based at least in part on receiving the particular identifier of the UE, the edge UE identifier.

16. The network node of claim 12, wherein the transmitted edge UE identifier is valid for a period of time constrained by a time interval.

17. The network node of claim 12, wherein the one or more processors are further configured to:

receive a particular identifier of the UE from an edge enabler client on the UE.

18. The network node of claim 12, wherein the one or more processors are further configured to:

receive a request for the identification information via an application programming interface; and transmit the identification information based at least in part on receiving the request.

19. The network node of claim 12, wherein the one or more processors are further configured to:

receive the private IP address of the UE included as part of a connectivity information type information element.

20. The network node of claim 19, wherein a particular identifier of the UE includes at least one of an internet protocol address, a home public land mobile network identifier, a serving public land mobile network identifier, a slice identifier, a UE identifier, a generic public subscription identifier, or an edge computing service provider identifier.

21. The network node of claim 12, wherein the transmitted edge UE identifier is valid for use by one or more pre-configured applications.

22. The network node of claim 12, wherein the request for identification information is received in connection with an edge enabler client registration request, and wherein the response is transmitted in connection with an edge enabler client registration response.

23. A method of wireless communication performed by a user equipment (UE), comprising:

transmitting, by the UE, a request for identification information, the request including at least one private internet protocol (IP) address of the UE, and the request including a list of edge application servers (EASs) associated with the request;

receiving, as a response to the request for identification information, a response message including the identification information, the identification information including an edge UE identifier assigned to the UE using the private IP address of the UE; and communicating based at least in part on receiving the identification information.

24. The method of claim 23, further comprising:

transmitting the identification information, wherein the identification information includes the edge UE identifier; and wherein communicating based at least in part on receiving the identification information comprises:

communicating based at least in part on transmitting the identification information.

25. The method of claim 23, wherein the received edge UE identifier is valid for a period of time constrained by a time interval.

26. A method of wireless communication performed by a network node, comprising:

receiving, from a user equipment (UE), a request for identification information, the request including at least one private internet protocol (IP) address of the UE, and the request including a list of edge application servers (EASs) associated with the request;

transmitting, as a response to the request for identification information, a response message including the identification information, the identification information including an edge UE identifier assigned to the UE using the private IP address of the UE; and communicating based at least in part on transmitting the identification information.

27. The method of claim 26, wherein the network node is an edge enabler server.

28. The method of claim 26, further comprising:

receiving, from the UE, the identification information, wherein the identification information includes the edge UE identifier; and wherein communicating based at least in part on transmitting the identification information comprises:

communicating based at least in part on receiving the identification information.

29. The method of claim 26, further comprising:

receiving a particular identifier of the UE from the UE; and transmitting, based at least in part on receiving the particular identifier of the UE, the edge UE identifier.

30. The method of claim 26, wherein the transmitted edge UE identifier is valid for a period of time constrained by a time interval.

\* \* \* \* \*